United States Patent
Hiller et al.

(10) Patent No.: US 8,065,481 B1
(45) Date of Patent: Nov. 22, 2011

(54) RAID SYSTEM AND METHOD COMPATIBLE WITH IMPROVED DRIVE SELECT

(75) Inventors: Bernhard Hiller, San Jose, CA (US); Pantelis Alexopoulos, San Jose, CA (US); Don Brunnett, Pleasanton, CA (US); Chandra Buddhavaram, Fremont, CA (US); Thierry Chatard, Fremont, CA (US); David Chew, San Jose, CA (US); Samuel R. Duell, San Jose, CA (US); Jeff Griffiths, Dublin, CA (US); Johanna Hernandez, San Jose, CA (US); Robert L. Kimball, San Jose, CA (US); Eric Kvamme, Scotts Valley, CA (US); LeRoy Leach, Boulder, CO (US); Michael Lee, San Jose, CA (US); James McGrath, Mountain View, CA (US); Kathleen Fitzgerald, legal representative, Centennial, CO (US); Robert Milby, Santa Cruz, CA (US); Bruce Schardt, Tracy, CA (US); Maurice Schlumberger, Menlo Park, CA (US); Erhard Schreck, San Jose, CA (US); Richard Sonnenfeld, Socorro, NM (US)

(73) Assignee: Seagate Technology LLC, Cupertino, CA (US)

( * ) Notice: Subject to any disclaimer, the term of this patent is extended or adjusted under 35 U.S.C. 154(b) by 2125 days.

(21) Appl. No.: 10/828,098

(22) Filed: Apr. 20, 2004

(51) Int. Cl.
*G06F 12/00* (2006.01)

(52) U.S. Cl. ............ 711/114; 711/4; 711/100; 711/105; 711/161; 711/162; 714/6.2; 714/6.21; 714/6.22; 714/6.23

(58) Field of Classification Search .............. 711/4, 100, 711/105, 111–114, 161–162; 714/5–6, 6.2, 714/6.21–6.23; 707/204
See application file for complete search history.

(56) References Cited

U.S. PATENT DOCUMENTS

| | | | | |
|---|---|---|---|---|
| 5,377,065 | A * | 12/1994 | Morehouse et al. | 360/256.4 |
| 5,740,397 | A | 4/1998 | Levy | 395/441 |
| 6,209,058 | B1 | 3/2001 | Shats et al. | 711/113 |
| 6,487,646 | B1 * | 11/2002 | Adams et al. | 711/163 |
| 6,490,651 | B1 | 12/2002 | Shats et al. | 711/112 |
| 6,526,477 | B1 * | 2/2003 | Yuan et al. | 711/114 |
| 6,560,099 | B1 | 5/2003 | Chang | 361/685 |
| 6,763,430 | B1 | 7/2004 | Camp | 711/112 |
| 6,941,423 | B2 * | 9/2005 | Coulson | 711/141 |

(Continued)

OTHER PUBLICATIONS

Seagate Technology, Inc.; Seagate Product Marketing; Technology Paper (TP-67D)—"Get S.M.A.R.T. for Reliability"; pp. 1-5; Jul. 1999.

(Continued)

*Primary Examiner* — Tuan Thai
*Assistant Examiner* — Zhuo Li
(74) *Attorney, Agent, or Firm* — David K. Lucente

(57) ABSTRACT

A RAID system is provided which can be implemented as a hardware RAID system while avoiding certain shortcomings of previous RAID systems. The RAID system makes it possible to avoid or reduce the number of buffers or processors and can take advantage of drive logic to achieve RAID functions or enhancements. RAID functionality can be provided in a manner to accommodate one or more ATA drive interfaces. To avoid drive replacement problems, host requests for drive serial numbers are responded to with a mirror serial number. In one embodiment, the read address is used to select which drive will perform a read operation.

19 Claims, 27 Drawing Sheets

U.S. PATENT DOCUMENTS

2003/0212859 A1* 11/2003 Ellis et al. .................... 711/114

OTHER PUBLICATIONS

Promise Technology, Inc.; Data Sheet for "FastTrak100 TX/LP Series"; 4 pages; ©2001.

Adaptec, Inc.; Data Sheet for "ATA/100 RAID Card Family"; 2 pages; © 2001.

ARCO; "DataProtection Solutions"; 1 page; ©2006; www.arcoide.com/product_patented.php.

Advanced Technology and Systems Co., Ltd. (ADTX); 1 page; ©2004; www.adtx.com/us.

Advanced Technology and Systems Co., Ltd. (ADTX); 1 page; ©2004; www.adtx.com/us/Productsmain.html.

* cited by examiner

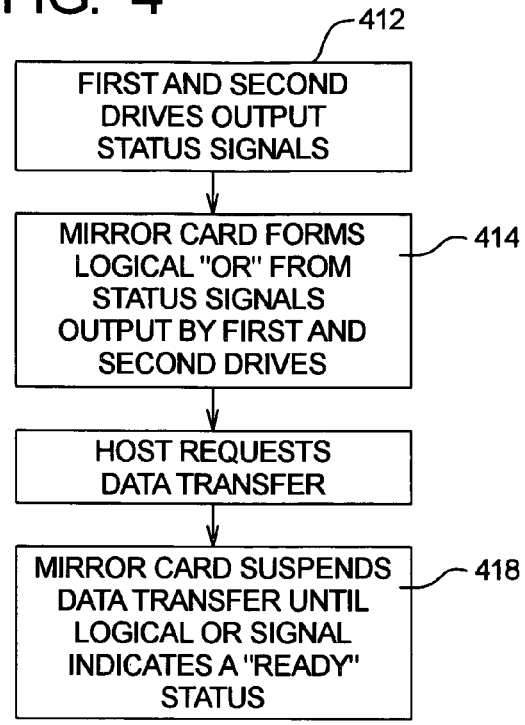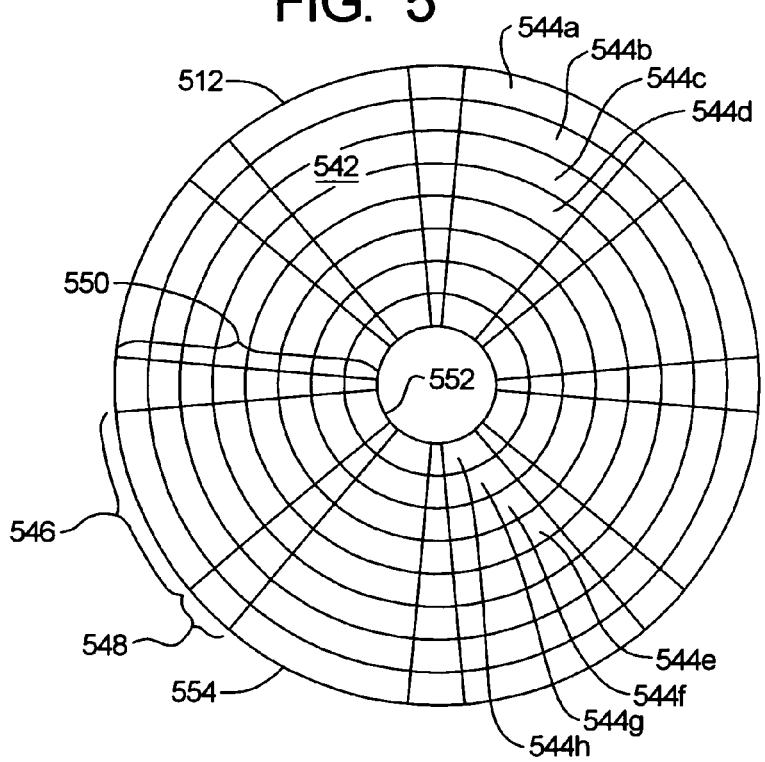

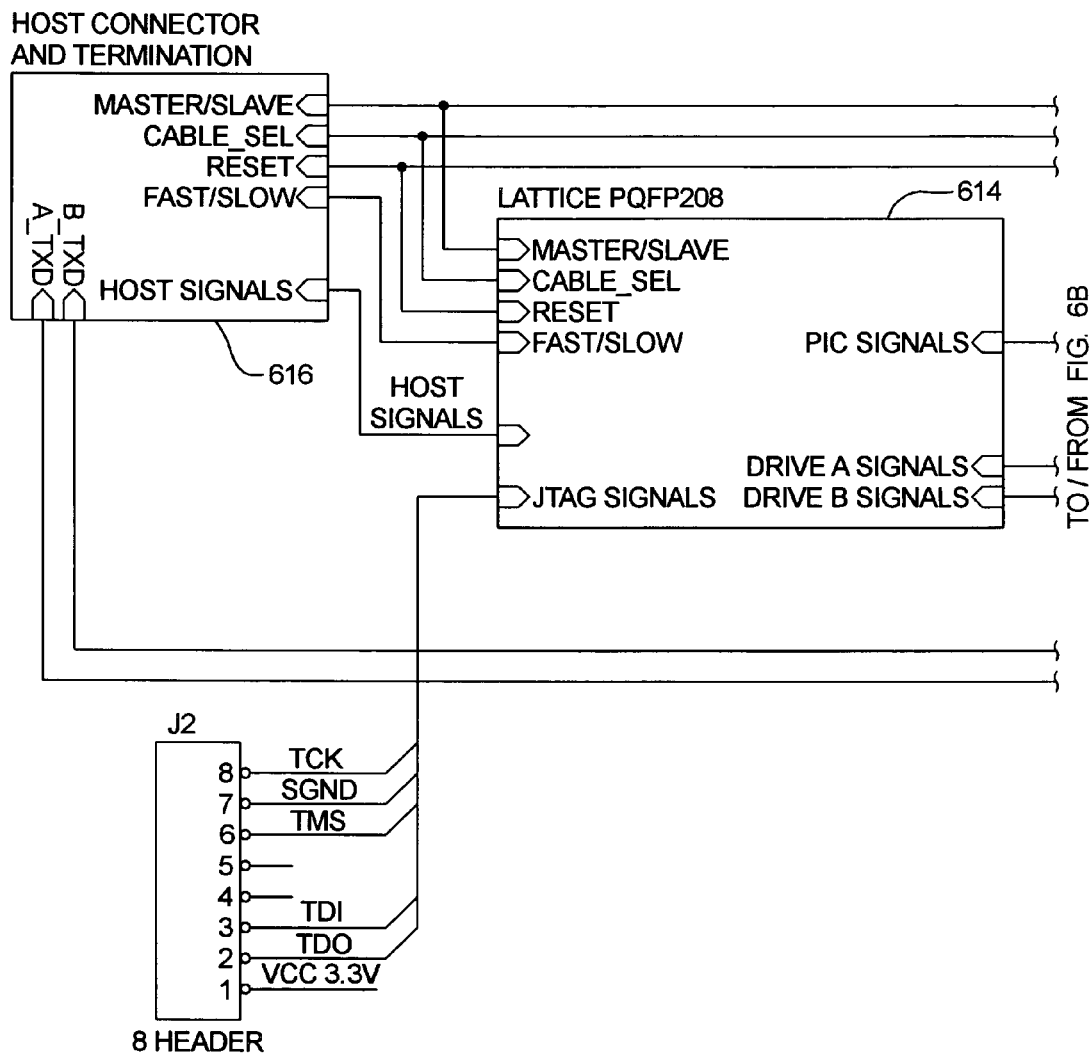

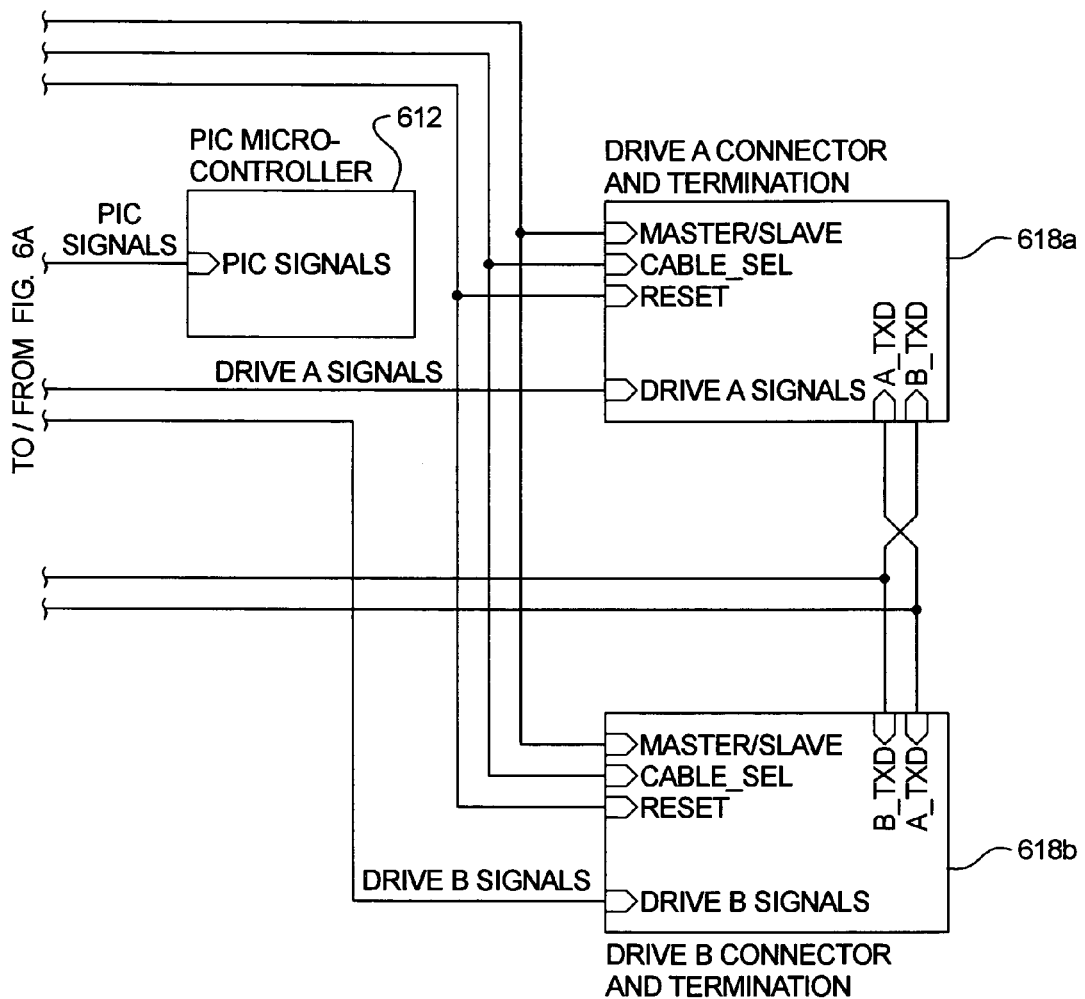

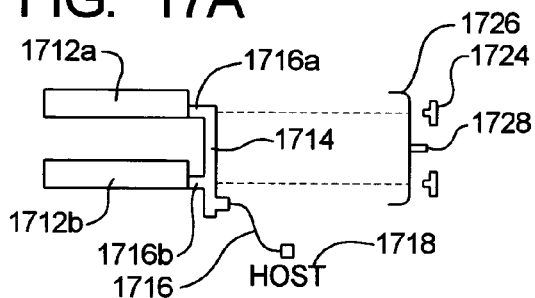
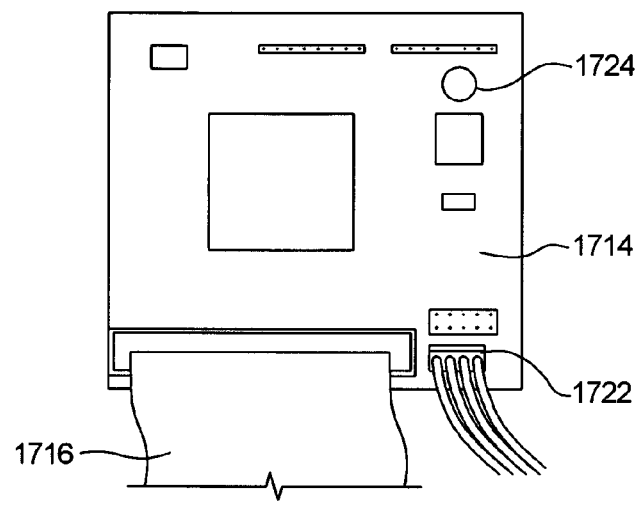
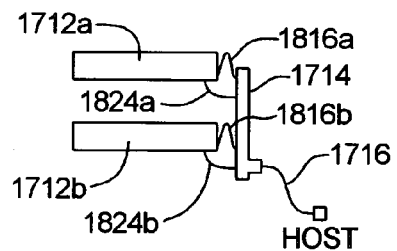
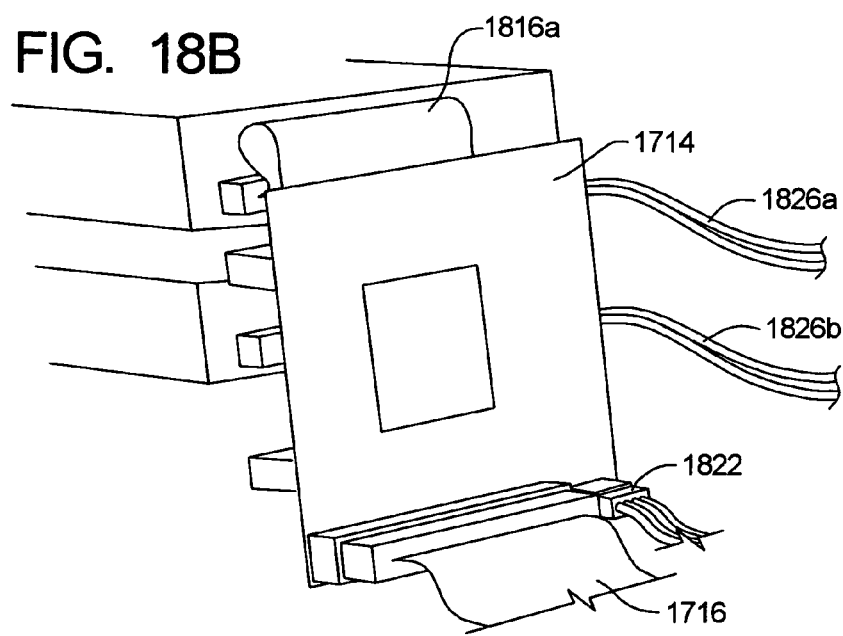

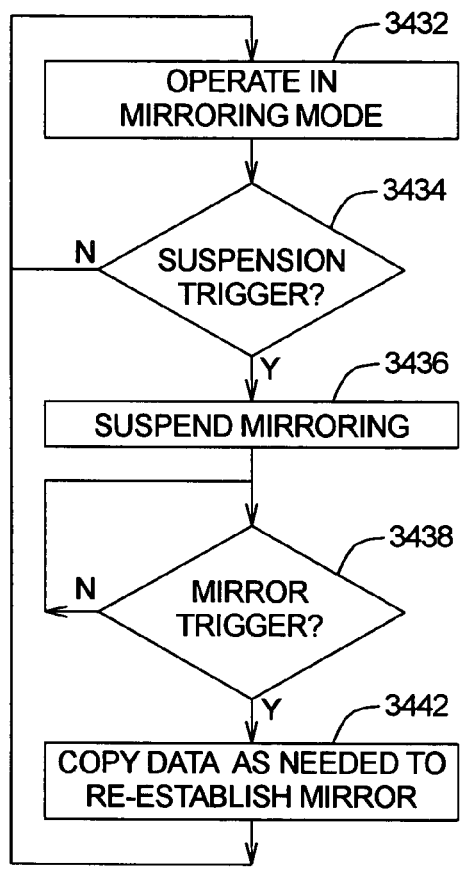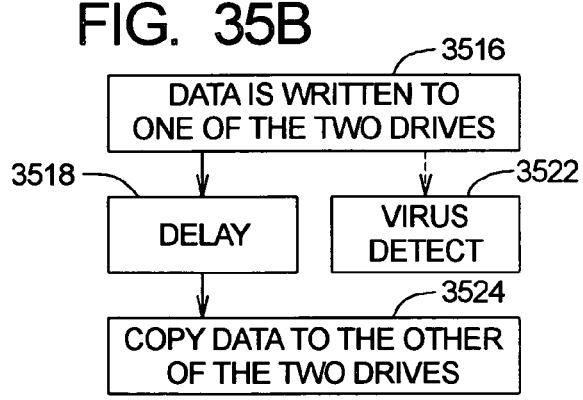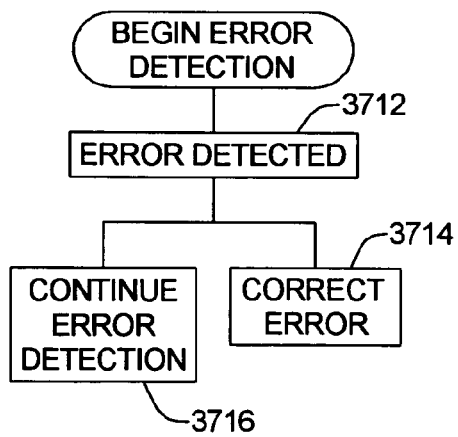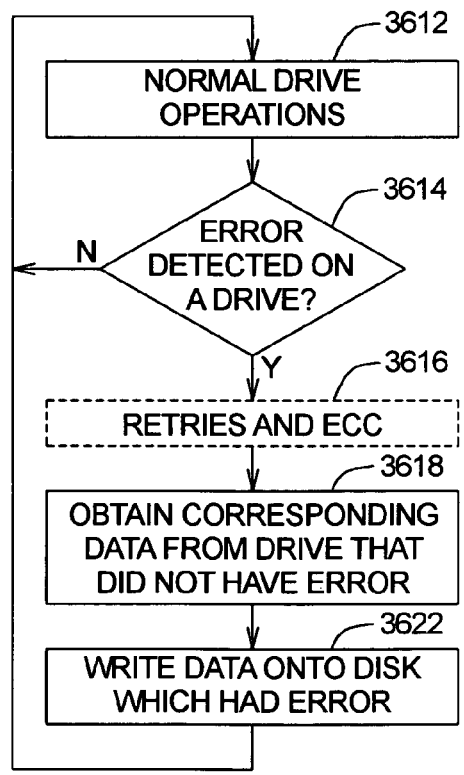

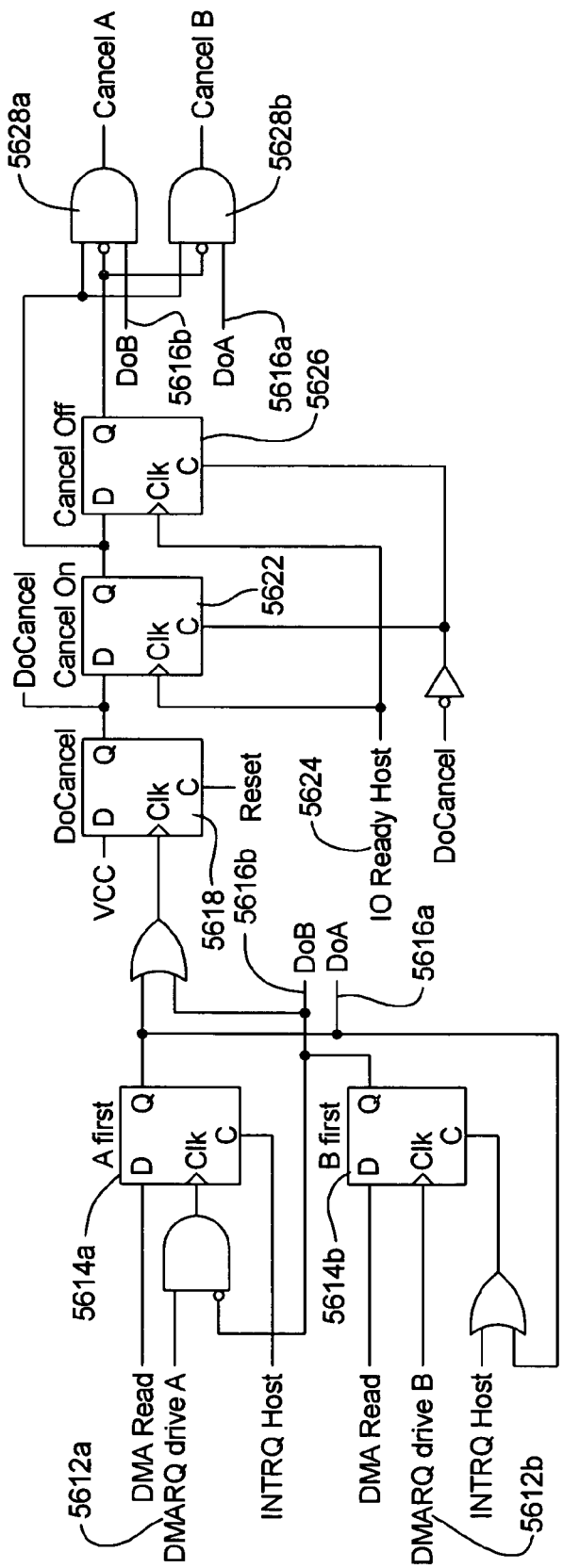

ously slow. Other examples of undesirably slow host-mediated

RAID SYSTEM AND METHOD COMPATIBLE WITH IMPROVED DRIVE SELECT

TECHNICAL FIELD

The present invention is directed to multiple data storage devices (such as disk drives), particularly with improvements which may include, e.g., drive select, internal and/or external mounting and content copying, error correction and/or performance enhancement, back channel-facilitated operations, and the like.

BACKGROUND INFORMATION

In many contexts, it is useful to provide partial or full redundancy for stored data. Although the present invention is not necessarily limited to disk drives, in the context of disk drives, data redundancy is sometimes described or provided as one of various types of RAID (redundant array of inexpensive drives) systems. In one such system, each disk drive has a corresponding "mirror" drive and operations are coordinated such that all, or substantially all, data written to one drive is also written to the other. Many previous RAID systems were provided primarily for purposes of data integrity, such that if some or all data was corrected or destroyed in one copy, another copy of the same data was available.

One common operation generally associated with RAID systems is drive select, and is typically used for determining from which of the two (or more) disk drives of the RAID system, data requested by the host, will be read. At least some previous approaches have used relatively complex systems of microprocessors and/or data buffers for performing operations such as drive select, or other RAID functions. Such approaches have contributed to undesirably high costs for RAID systems and, accordingly, it would be advantageous to provide an implementation for a RAID system, while eliminating the need for a microprocessor and/or data buffers.

In some approaches to RAID systems, read functionality is achieved substantially by software running on a host device. Such systems can be vulnerable, however, if the host device operating system fails to "boot" on one of the drives of the RAID system. This is believed to be a difficulty with software RAID systems, even though "boot files" may reside on both disks of a RAID system. Accordingly, it would be useful to provide a RAID system which is relatively less susceptible to boot up problems than the typical software RAID system.

In at least some RAID systems, RAID functionality is provided on a circuit board which often, but not always, occupies a PCI slot and which is typically substantially standalone, in the sense that it does not substantially take advantage of capabilities which are, or can be, available on other components of the RAID system, such as drive firmware or other logic. Accordingly, it would be useful to provide a RAID system which utilizes drive firmware to augment its functionality.

Many previous RAID systems respond to a read error by switching future reads to a secondary or backup disk of the RAID system. Often, it is left to the user to attend to the task of resynchronizing the data (so that at least two copies of all data are distributed among the disk of the RAID system). Until such manual resynchronization is performed, there is a risk that an error in the second disk of the RAID system could render some data irretrievably lost. Accordingly, it would be useful to provide a RAID system which can readily resynchronize data after an error, preferably in a manner substantially transparent to the user.

Many previous RAID systems are directed to data security and integrity. Little, if any, attention has been given to opportunities for enhancing system performance, such as decreasing latency and/or improving data throughput. Accordingly, it would be advantageous to provide a RAID system which provides enhanced performance using a two (or more) disk combination.

In a number of contexts, it may be desirable to perform a substantially full transfer or copy of the contents of one disk to another. One example might occur when one drive of a RAID or multi-drive system is replaced. Disk duplication provides another example. Such operations often involve transferring data from a source drive, to a host computer and then transferring the data from host computer to the other drive, for writing thereon. This procedure can be undesirably slow. Other examples of undesirably slow host-mediated transfers can include data transfers for purposes such as disk resynchronization, error correction, and the like. Accordingly, it would be useful to provide a system for transferring information between two or more disk drives in a RAID system or multi-disk system which does not require mediation of intermediate transfer to a host computer.

Many previous RAID systems use circuitry for providing at least some RAID functionality which resides on cards positioned a substantial distance from the drives, often providing for communication through relatively long ribbon cables and the like. Relatively long path lengths can undesirably degrade signal quality, particularly in the case of high speed data transfer rates. Accordingly, it would be useful to provide a RAID system which can reduce the length of some signal paths compared to previous RAID systems.

Many previous RAID systems, intended for use in a typical personal computer or desktop computer context, employ the same general type of disk drives which are used as individual disk drives in non-RAID applications. Most desktop computers have a chassis which defines one or more "bays" for accommodating disk drives or similar components, each bay having a "form factor" which is substantially a rectangular solid having a width, height and depth. Disk drives intended for use in desktop computers are typically manufactured to fit within a predefined "form factor." There are, in general, several well-established form factors including, e.g., a "5.25 inch drive" form factor, a "3.5 inch drive" form factor, and a "CD ROM" form factor. Because, as noted, many previous approaches to a RAID system for a desktop computer have employed substantially standard disk drives, in many previous approaches a two-drive RAID system would require the use of two drive bays, plus, possibly, additional space (potentially occupying yet another drive bay) for control cards, connectors, or other components. Because it is generally desirable to minimize spatial requirements of a system (e.g., to free space for other components and/or simplify cooling requirements), it would be useful to provide a desktop computer RAID system which can be substantially positioned within a single drive bay, such as a single 5.25 inch form factor, a single 3.5 form factor, or a single CD ROM form factor, preferably, including any required control cards, connectors or similar components.

SUMMARY OF THE INVENTION

The present invention includes a recognition and appreciation of the existence, and/or nature of problems or shortcomings in previous approaches including those described herein.

According to one aspect of the present invention, circuitry for providing drive selection or other RAID functionality is achieved without the need for providing additional processors or data buffers (i.e., processors or buffers in addition to those that might normally be present in a desktop computer which is configured without RAID). Preferably such RAID functionality is provided in a manner to accommodate one or more ATA drive interfaces. In one embodiment, processorless and/or bufferless RAID circuitry is achieved by employing one or more gate arrays such as including a programmable gate array logic chip. Logical-OR functionality can be achieved by any of a number of approaches or devices including a properly configured gate array, as will be understood by those with skill in the art. Preferably, RAID systems, including embodiments of the present invention, take advantage of drive logic to achieve RAID functions or enhancements.

In one embodiment of the invention, data transfers to, from or between disk drives can at least sometimes be performed substantially directly, i.e., without the need to first send the data to an intermediate and/or remote unit, such as a host computer. In one aspect, each of two or more disk drives has a serial port, such as an RS-232 port, and these ports are connected substantially directly to provide a "back channel, data communications path." Although such a back channel can be used for numerous purposes, preferably the back channel is used in connection with at least some RAID functionalities or enhancements, such as disk copying or mirroring, error correction, head position prediction, and the like.

Some embodiments of the present invention involve the recognition of opportunities for performance enhancement which are presented by the presence of two (or more) copies of at least some data on a multi-disk system, such as a RAID system. In one embodiment, disk rotation latency can be reduced, on average, based on the recognition that, if corresponding data is not always precisely in rotational phase between two or more disks, the rotational latency for one or the other of the disks will be less than the (average) rotational latency for data on a single disk. In one embodiment, defect tables are mirrored between the two (or more) disks of a RAID system, so that it is possible to maintain the disks such that corresponding data is always in a fixed phase relationship (such as 180 degrees out of phase) between the disks. In one embodiment, rotational phase of one or more of the disks of a system are periodically or randomly changed to avoid disks being maintained substantially in-phase for sustained periods of time.

Embodiments of the present invention also include the recognition that, in addition to a potential for reducing rotational latency, the presence of two or more copies of data on different disks also presents an opportunity for reducing head positional latency ("seek time"). In general, unless drives are specifically controlled to avoid this situation, when there is a desire to read (or write) data which reside on target tracks on first and second disks (which may be the same tracks or different tracks, on the two disks), the time required to position the head over the target track of one disk will be different from the time required to position the head over the target track of the second disk. In one embodiment of the invention, head positioning for a read is performed on all disks of the RAID system (which contain the target data) and the data is returned to the host by reading the data from the first disk ready. In one embodiment of the invention, this procedure also involves an abort of the seek and/or read operation on other disks of the system, e.g., to avoid having the system wait for completion of the operation by all disks (and thus, potentially, losing some, or all, of the time advantage potentially available from a "first disk ready" operation). In at least one embodiment, in order to achieve an abort which is sufficiently rapid (i.e., which aborts the seek or read operation on drives, other than the first drive ready, with sufficient rapidity that, on average, head positioning latency is reduced, compared to a non-RAID system), the abort is performed at a hardware level, e.g., without requiring execution of driver software (such as a host driver). In one embodiment of the invention, head position latency is reduced by predicting which head will reach the target track first and sending the read (or, in some cases, write) command only to that disk. In one embodiment, head prediction is performed using disk drive logic, preferably involving back channel communication of head prediction information. In one embodiment, disk drives are controlled in such a manner that average head positions on the two disks are non-random (on average). For example, by controlling disk drives such that a first drive head spends more than half its time over tracks with addresses in the upper half of the address range and the other drive head spends more than half its time over tracks with addresses in the lower half of the address range, at least some head positioning latency improvement can be achieved by sending data transfer requests with addresses in the upper half of the address range to the first disk and sending data transfer requests with addresses in the lower half of the address range to the second disk.

In general, a major feature of RAID systems involves the manner in which the RAID system can respond to the occurrence of errors. In general, as used herein, "errors" refers to a drive "bad status" (e.g., ECC error or other bad status as opposed to, e.g., a miscompare). One type of error which, in at least some systems, can be of particular concern, is an error which occurs in reading one or more "boot files", i.e., data which is used by the computer to initiate normal operation, e.g., after a period of power-down. As noted above, at least some previous RAID systems, such as software RAID systems, rely on software drivers, executing on the host device, to perform some or all RAID functions. Accordingly, in at least some such software RAID systems, the RAID system is unable to overcome a boot file error since boot-up of the host computer would be required in order to execute the software drivers used to access the second or backup drive which may contain a backup copy of the boot files. According to one embodiment, automatic failover (automatically accessing data from one drive when access to a first copy of the data on a first drive has failed) can be performed, at least for boot files (and preferably, for substantially all data), without the need for executing software on the host device; and, accordingly, it is possible to perform boot from boot files on the backup drive when there has been a failure to access boot files on a primary drive. In at least some embodiments of the present invention, the system can not only access data (preferably, not restricted to only the boot-up files) from a second drive, in the event of error when attempting access on a first drive, but can also use the second copy of the data to fully or partially correct the error on the first drive. In one embodiment of the invention, such error correction is substantially transparent to the user (i.e., does not require the user to input any commands or the like), although notification to the user can be provided, if desired. In one embodiment of the invention, substantially all aspects of error correction are performed locally within the RAID system, i.e., substantially without the need for executing software on the host system, preferably such that the host system need not even be notified of the occurrence of the error (although such notification can be made if desired, e.g., for reliability statistics purposes, and the like). In one embodiment, error correction is performed without the need for transferring any error correction data to the host, e.g., by transferring data from one drive to another by back channel communications. In another embodiment, correction of errors is performed, at least partially, by drivers executing on the host. It is possible that, following an occurrence of an error, the system may be placed in a power-down state. In one embodiment, in order to avoid the loss of the error information, at least some error information is stored in a non-volatile memory. In one embodiment, error information is stored on an electronically-erasable programmable read-only memory (EEPROM).

In order for at least some of the RAID functions to be performed, it is generally necessary to provide for duplication of at least some, and preferably substantially all, data among the two or more disks of a RAID system. According to one aspect of the invention, the mirroring process is delayed, e.g., by a predetermined or user selected period, either for substantially all data, or, in some embodiments, for selected types or sources of data. One use of such delay is to provide a period of time in which data can be scanned for the presence of, e.g., a virus, thus, potentially avoiding a situation where a virus infects both disks (in a two disk RAID system) of a RAID system. In one embodiment, a list is formed of the address blocks for data which is written to a first drive and not immediately mirrored on a second drive. In this way, re-mirroring can be performed by copying data from all locations on such lists, to the second drive. In one embodiment, such re-mirroring is performed by transferring data from one drive to another using a back channel. In some situations, it may be desired to copy substantially all files from one of the drives onto another drive of the RAID system. Examples include when one of the drives of the system has been replaced or when a RAID system is implemented on a multi-drive system for the first time, or after a period of suspension of RAID functionality. In one embodiment of the invention, such copying of substantially all of the contents of one disk to another, is performed in a rapid manner by avoiding the need for transferring the data to a host computer, and thence to the second drive, as part of the copying process. In one embodiment, avoidance of transfer to and from the host computer is achieved by using a back channel data pathway for some or all such data transfer.

When a drive of the RAID system has been replaced, it is possible that the capacity of the replacement drive may be different from the capacity of the replaced drive (and/or different from the capacity of other drives in a RAID system). In one embodiment of the invention, the system substantially automatically detects such difference in capacity and adjusts the system so as to avoid potential problems with RAID functionality. In one embodiment, when the replacement drive has a capacity larger than the replaced drive, the system substantially automatically sets a "maximum address" for the replacement drive equal to the maximum actual capacity of remaining (non-replaced) drive (or equal to the maximum capacity of the smallest remaining drive, in a RAID system with more than two drives). If the replacement drive has a capacity which is smaller than the capacity of the replaced drive, (and, typically, smaller than the capacity of the remaining drive) the system, using user prompts or, in some cases, substantially automatically, performs compaction of data and/or prompts the user to delete data and/or replace a drive with a larger capacity drive. In general, a replacement drive will have a different manufacturer's serial number from the serial number of the drive it replaces. In systems which use drive serial numbers to generate a security key, one or more applications on the hard disk may fail to execute (because the security key generated from the serial number of the replacement drive does not match the security key generated before the drive was replaced). According to one embodiment of the present invention, some or all drives in the RAID system are associated with an additional "mirror" serial number, and host requests for drive serial numbers are responded to with the mirror serial number. In this way, although the RAID system may have multiple drives, this fact, in many ways, is "transparent" to the host system which "sees" only a single drive and/or a single serial number.

In one embodiment of the present invention, the RAID system is configured to physically fit one (or more) disk drives into a relatively small space such as a 5.25 inch form factor, a 3.5 inch form factor, or a CD ROM form factor. A 3.5 inch form factor has a width of 3.5 inches (8.9 centimeters) and a height of 1 inch (2.5 cm). A 5.25 inch form factor has a width of 5.25 inches (13.3 cm) and a height of (8.9 centimeters), 1.5 inches (3.2 cm) for a half-high drive. A 5.25 drive bay has a width of 5.75 inches (14.6 cm), a depth of 8 inches (20.3 cm) and a height of 1.63 inches (4 cm). A 3.5 drive bay has a width of 4 inches (10 cm), a depth of 5.75 inches (14.6 cm) and a height of 1 inch (2.5 cm). A "half-high" bay generally refers to a bay with a height of 1.63 inches (4 cm). The CD ROM form factor is substantially the same as a 5.25 inch form factor. In some embodiments, some or all of the drives of a multi-drive system are configured to accommodate user removability. In one embodiment, the drive is provided with a rail or similar system for guiding drives into, or out of, position. In some embodiments, drives are substantially covered with, or otherwise provided with, a shock resistant covering or material. In some embodiments, a locking door is provided, e.g., to restrict access to a removable drive. In some embodiments, data encryption is provided to protect against unauthorized use of a drive removed from a system. In some embodiments, a system is configured to discourage positioning of the drives in other than an orientation with a plane of the drives substantially vertical, e.g., to assist in avoiding shock or other mechanical damage to removed disk drives.

In one embodiment, one or more disks of the disk drive are provided in an external "box" or housing substantially separate from the desktop computer housing, and connected thereto by, e.g., USB, Firewire, Ethernet or wireless data paths. In one embodiment, such external box is provided with vents or other openings and/or with a disk drive orientation (e.g., substantially vertical) to provide a convective or "chimney effect" air flow to at least partially assist in drive cooling, preferably so as to reduce or eliminate the need for potentially noisy cooling fans. In various embodiments, drives in such an external box can be either substantially fixed or user-removable.

In one embodiment, the form factor, or relatively small space, accommodates not only two or more disk drives from the RAID system, but also a RAID-control circuit card or other circuitry. In one embodiment, clamps, brackets, bolts or screws are used to, preferably directly, couple disk drives with respect to one another in substantially rigid arrangement. In one embodiment, two disk drives are coupled in a face-to-corresponding-face configuration with a RAID control card between. In one embodiment, disk drives are coupled to a RAID control card using low insertion force connectors, such as for achieving ease of removal or insertion (e.g., in connection with user-removable drives). In one embodiment, RAID card or circuitry is positioned a relatively short distance from the drives such as less than about 15 centimeters, preferably less than about 10 centimeters. In one embodiment, a shield, optionally provided with a handle, may partially cover some of the RAID circuitry or connectors. In one embodiment, the shield is formed of a substantially conductive material and, preferably, grounded to provide an electromagnetic interference (EMI) shield. In one embodiment, a RAID card is coupled to one or more of the disk drives by a substantially rigid connector. In one embodiment, a RAID card is coupled to one or more of the disk drives by a ribbon cable or other semi-stiff component.

In at least one embodiment of the invention, a RAID system is provided which can be implemented as a hardware RAID system, while avoiding certain shortcomings of previous RAID systems. It can be implemented without the need for occupying a PCI slot, so as to fit within a standard drive form factor. The system can provide automatic failover and can continue to operate even after a failure of a boot sector. Disk drives of the system, either in a PC chassis, or an external box, can be provided as non-removable or user-removable. Mirroring delay or hold-off can avoid virus infection or other problems. RAID control circuitry is, preferably, on a card directly coupled to two or more drives using rigid connectors and/or flex connectors. RAID control is preferably provided without processors or buffers. The presence of two or more copies of data is exploited to enhance performance. Read errors can be repaired on-the-fly or in a disk scan process.

BRIEF DESCRIPTION OF THE DRAWINGS

FIG. 4 is a flowchart of a procedure according to an embodiment of the present invention;

FIG. 5 is a diagrammatic illustration of a conventional disk surface which has been formatted to be used in conjunction with a sectored servo system;

FIGS. 6A and 6B form a block diagram of a system including a bridge showing signal connections therebetween;

FIG. 17A is a schematic, side view showing relative positioning of two drives of a RAID system according to an embodiment of the present invention;

FIG. 17B is a rear elevational view depicting an interface card of a type usable in accordance with an embodiment of the present invention;

FIG. 18A is a schematic side view showing relative position and coupling of two drives of a RAID system usable in accordance with an embodiment of the present invention;

FIG. 18B is a rear perspective view of an interface card according to an embodiment of the present invention;

FIG. 34B is a flowchart of a procedure for a type of mirroring useful in accordance with an embodiment of the present invention;

FIG. 35B is a flowchart of a procedure using delayed mirroring according to an embodiment of the present invention;

FIG. 36 is a flowchart of a procedure including error response according to an embodiment of the present invention;

FIG. 37 is a flowchart of a procedure including error detection according to an embodiment of the present invention;

FIG. 56 is a logic diagram depicting seek abort logic according to an embodiment of the present invention.

DETAILED DESCRIPTION OF THE PREFERRED EMBODIMENT

Data storage devices including, e.g., those normally provided as part of, or in connection with, a computer or other electronic device, can be of various types. In one general category, data is stored on a fixed or rotating (or otherwise movable) data storage medium and a read head, a write head and/or a read/write head is positioned adjacent desired locations of the medium for writing data thereto or reading data therefrom. One common example of a data storage device of this type is a disk drive (often called a "hard" disk or "fixed" disk drive). Although many concepts and aspects pertaining to the present invention will be described herein in the context of a disk drive, those with skill in the art, after understanding the present disclosure, will appreciate that the advantages provided by the present invention are not necessarily limited to disk drives.

Computer disk drives store information on magnetic disks. Typically, the information is stored on each disk in concentric tracks, divided into sectors. Information is written to and read from a disk by a head (or transducer), which is mounted on an actuator arm capable of moving the head along a (typically arcuate) path to various radial positions over the disk. Accordingly, the movement of the actuator arm allows the head to access different tracks. The disk is rotated by a spindle motor at a high speed, allowing the head to access different sectors on the disk. The head may include separate, or integrated, read and write elements.

Figure 1:
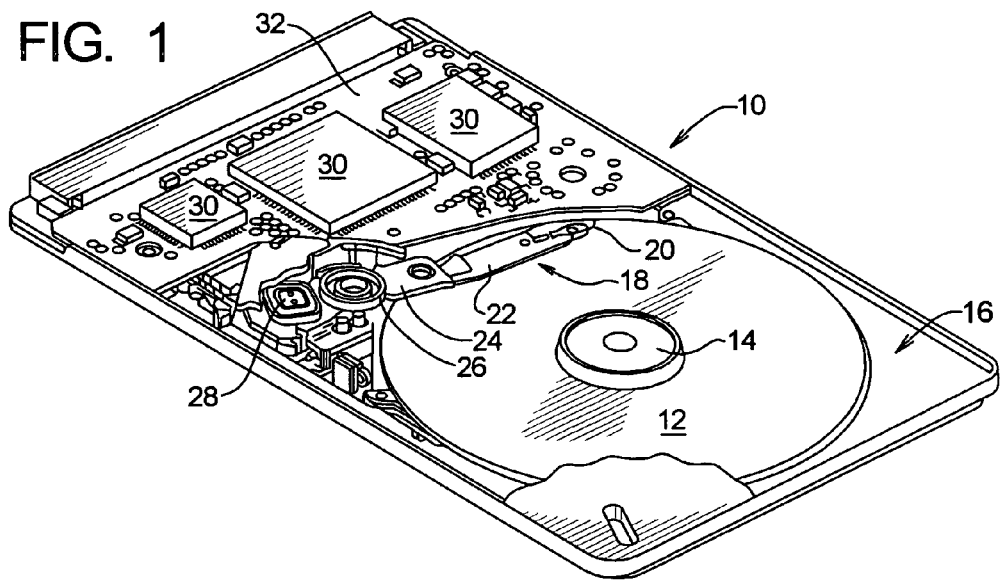
FIG. 1 is a diagrammatic representation of a disk drive usable in connection with the present invention.

A disk drive 10, exemplary of numerous types of drives that can be used in connection with embodiments of the present invention, is illustrated in FIG. 1. The disk drive comprises a disk 12 that is rotated by a spin motor 14. The spin motor 14 is mounted to a base plate 16.

The disk drive 10 also includes an actuator arm assembly 18 having a head 20 (or transducer) mounted to a flexure arm 22, which is attached to an actuator arm 24 that can rotate about a bearing assembly 26 that is attached to the base plate 16. The actuator arm 24 cooperates with a voice coil motor 28 in order to move the head 20 relative to the disk 12. The spin motor 14, voice coil motor 28 and head 20 are coupled to a number of electronic circuits 30 mounted to a drive PCB (printed circuit board) 32. The electronic circuits 30 typically include a read channel chip, a microprocessor-based controller and a random access memory (RAM) device. Instead of a one-disk configuration (shown in FIG. 1), the disk drive 10 may include a plurality of disks 12 and, therefore, a plurality of corresponding actuator arm assemblies 18.

FIG. 5 is a diagrammatic representation of a simplified top view of a disk 512 having a surface 542 which has been formatted to be used in conjunction with a sectored servo system (also known as an embedded servo system). As illustrated in FIG. 5, the disk 512 includes a plurality of concentric tracks 544a-544h for storing data on the disk's surface 542. Although FIG. 5 only shows a relatively small number of tracks (i.e., 8) for ease of illustration, it should be appreciated that typically tens of thousands of tracks are included on the surface 542 of a disk 512.

Each track 544a-544h is divided into a plurality of data sectors 546 and a plurality of servo sectors 548. The servo sectors 548 in each track are radially aligned with servo sectors 548 in other tracks, thereby forming servo wedges 550 which typically extend radially across the disk 512 (e.g., from the disk's inner diameter 552 to its outer diameter 554).

One of the operations that a disk drive performs is known as a seek operation. During a seek operation, the head 20 is moved from a present track of the disk to a target track of the disk, so that a data can be read from, or written to, the target track. In order for a seek operation to be performed, a current is delivered to the voice coil motor (VCM) 28 of the disk drive, which causes the actuator arm 24 to rotate, thereby moving the head 20 along an arc intersecting various radial positions relative to the disk surface 542.

When it is desired to use one (or more) disk drives to achieve RAID functionality, it is typically necessary to provide additional logic for implementing such functionality. In some previous systems, such logic was achieved by drivers or other software executing on a host computer (or other host device). This approach consumes an amount of host processing resources, and the RAID-associated hardware provides substantially no useful function without the driver. In software-based systems, failure of the operating system to boot on one of the drives (if the system is operating on the "boot" drives) can render the whole system inoperative, thus substantially defeating the purpose of RAID.

Figure 2:
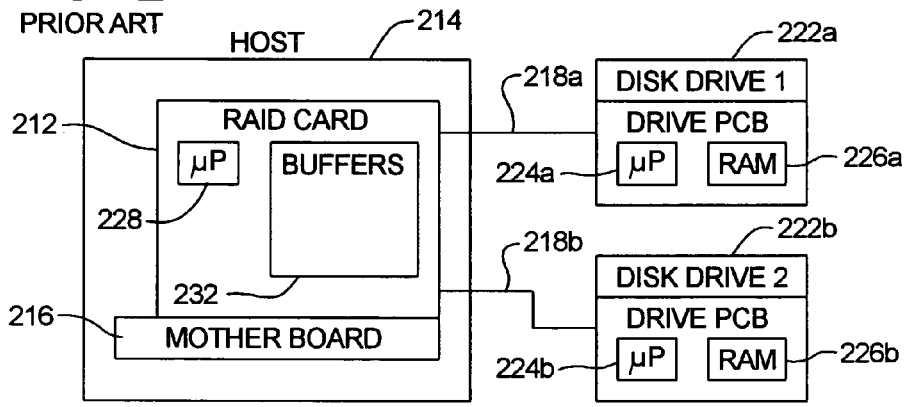
FIG. 2 is a block diagram of a RAID system according to previous approaches.

Other previous RAID systems were at least partially hardware-based, such as providing some or all of the required logic on a circuit board or RAID card 212 (FIG. 2). The RAID card was connected, within the host 214, typically through a mother board 216, and provided typically separate data and/or control lines to 218a, 218b to first and second disk drives 222a, 222b of the RAID system. As noted above, it is not uncommon for disk drives 222a, 222b to include their own microprocessors 224a, 224b and/or RAM, 226a, 226b, e.g., on associated drive PCB's. However, RAID cards 212 often included their own microprocessors 228 and/or data buffers 232. Without wishing to be bound by any theory, it is believed previous RAID cards were often configured in this manner because it was desired to provide for RAID functionality by using two (or more) substantially "off the shelf" disk drives, and accordingly, it may have been considered substantially infeasible to use PCB logic for non-standard drive processes (such as RAID). In any case, the presence of processors and/or buffers on previous RAID cards is believed to have contributed to undesirably high costs for such cards.

In one embodiment of the present invention, circuitry for providing at least some RAID functionality is provided in substantially hardware form, preferably on a PCB or circuit card (referred to herein as a "mirror card"). Preferably, the mirror card provides RAID functionality, while eliminating the need for a processor and/or data buffers. Although at least some aspects of the present invention can be implemented in a plurality of different contexts, it is believed especially useful to provide a mirror card which can achieve RAID functionality while communicating with the host 314 (FIG. 3) according to an ATA interface, preferably a serial ATA (SATA) interface 310.

Figure 3:
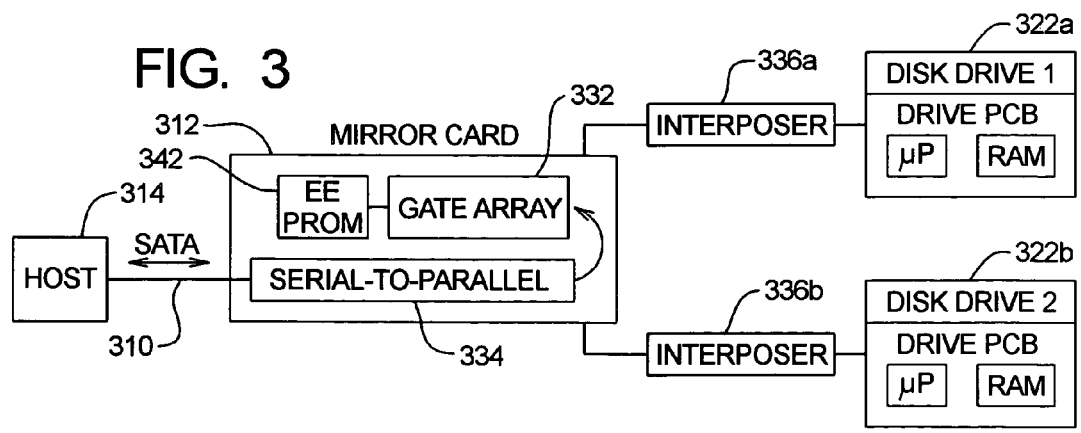
FIG. 3 is a block diagram of a RAID system according to an embodiment of the present invention.

In the embodiment of FIG. 3, a processorless, bufferless mirror card 312 is provided with a gate array 332 which provides at least some of the logic used in achieving RAID functionality. In the embodiment of FIG. 3, a serial-to-parallel converter 334 (which may take the form of a serial ATA to parallel ATA bridge chip) is used to make it feasible to employ a (generally relatively inexpensive) gate array 332 for providing a cost-effective overall SATA system for RAID functionality. In the embodiment of FIG. 3, the mirror card 312 is connected to the disk drives 322a, 322b by first and second interposer boards 336a, 336b. As described below, interposer boards can be provided for low insertion force coupling to the mirror card 312 (e.g., for achieving user-removable drives and/or ease of assembly).

In general, providing processorless and bufferless RAID hardware, such as processorless and bufferless ATA RAID, according to one embodiment of the invention, involves presenting data (such as write data), to both drives 322a, 322b substantially at once, and configuring systems such that the drives 332a, 322b jointly control the data flow, for at least some operations.

In the embodiment depicted in FIGS. 6A and 6B (which shows a configuration which might, e.g., be used for development purposes, and the like), a type of mirror board is provided which includes a programmable integrated circuit (PIC) microcontroller 612 and a PQFP (Plastic Quad Flat Pack) lattice adapter 614 along with a host connector 616, and first and second drive connectors 618a, 618b. Those with skill in the art will understand the depicted signal paths as well as standard items not depicted, such as power supply and the like.

In the embodiment depicted by FIG. 4, both the first and second drives are configured to output a status signal 412. Depending on the implementation, one of the output status signals may be a "busy" signal or, in other implementations, a "ready" signal.

Figure 7:
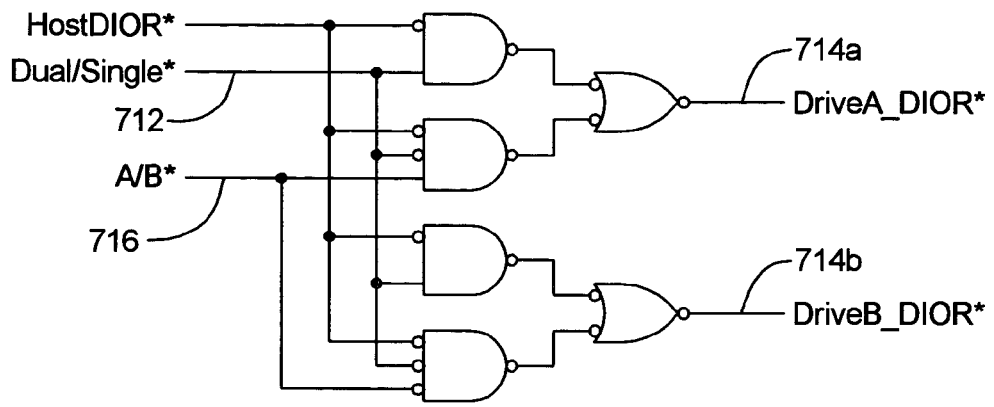
FIG. 7 is a logic diagram depicting control signals from a host adapter to drives according to an embodiment of the present invention.

For PIO (Programmable Input/Output) mode transfers, (read or write) "busy" lines of the two drives are ORed 414. In this way, transfer of data does not continue until both drives are ready 418. In a UDMA (Ultra Direct Memory Access) write, the host clocks the data to the drives on DIOR* (Drive Input/Output Read) lines. When the dual/single signal 712 (FIG. 7) from the mirror card 312 is high (normal dual mode), the DIOR* signal is sent to both drives. When the dual/single signal 712 is low, (single drive mode), the logic then uses the A/B* signal 716 from the mirror card 312 to direct the DIOR* signal to only drive A or drive B. Preferably other control signals like drive IO write (DIOW*) and direct memory acknowledge (DMACK*) that the host sends to the drives are connected in the same manner as the connections provided for DIOR*, illustrated in FIG. 7.

In UDMA write-5, the host clocks the data to the drives on DIOR and the clock is buffered and replicated and presented to both drives. Pausing the UDMA transfer causes DIOR to pause and, thus, the drive that didn't request a pause still waits for data. The host uses the DIOW* line to terminate the transfer to both drives. On UDMA read, the "selected" drive receives DIOR. The other drive may be asked to do a read-verify (for added assurance of data integrity) or may simply have the command aborted. Once selected, the drive is effectively hard-wired to the host and transfer proceeds as for any single ATA drive. Preferably, these procedures allow the transfer to stay synchronized bit-for-bit between the drives while eliminating (costly) buffers. The ability to avoid a processor allows substantial reduction in the complexity of firmware (such as firmware for ASICSor gate array code), instead, allowing the drives (e.g., the circuitry components on the drive PCB's) to contain much of the system intelligence.

The hard-drives are programmed with special mirror-drive firmware code. Dedicated logic gates inside the mirror logic board, and the mirror-drive firmware in the hard-drives, work in conjunction to control all functions of the mirror-drive. The mirror drive has several modes of operation.

1. Normal Dual Mode—This is the default mode of operation for Write and Non-data instructions. When this mode is selected, commands from the host are sent to both drives. The Host can select Normal Dual Mode by sending a mirror command.

2. Normal Dual Fast Read Mode—This is the default mode of operation for Read instructions. This mode enables, e.g., a 5400 RPM mirror drive to read data about 33% faster than a single drive. The increased speed is due to the reduction of rotational latency. The drive with the least latency is selected. In this mode, the Read instruction is sent to both drives and the drive that first finds the sector data is used to return the data. When this takes place, the mirror control logic sends an abort to the other drive. The host can select Normal Dual Fast Read Mode by sending a mirror command during configuration of the hardware and software.

3. Normal Dual Safe Read Mode—This is the safest mode of operation. When this mode is selected the mirror drive reads sectors about 33% slower than a single drive. The slower operation is because the rotational latency of both drives determine when data is read. The advantage of this mode is that all sectors are read on both drives. This avoids latent RAID errors by verifying, on every LBA read, that there are two valid copies of the data. The read command from the Host is sent to drive A. At the same time, the mirror control board sends a Read-Verify command to drive B. The host can select Normal Dual Safe Read Mode by sending a mirror command. This mode can also be selected via hardware jumper.

4. Single Drive Mode—This is a special mode which is typically used when one drive has malfunctioned. In this mode, commands are only sent to one of the drives. This mode is automatically selected when one of the drives malfunctions. The host can also select Single Drive Mode by sending a mirror command.

Figure 8:
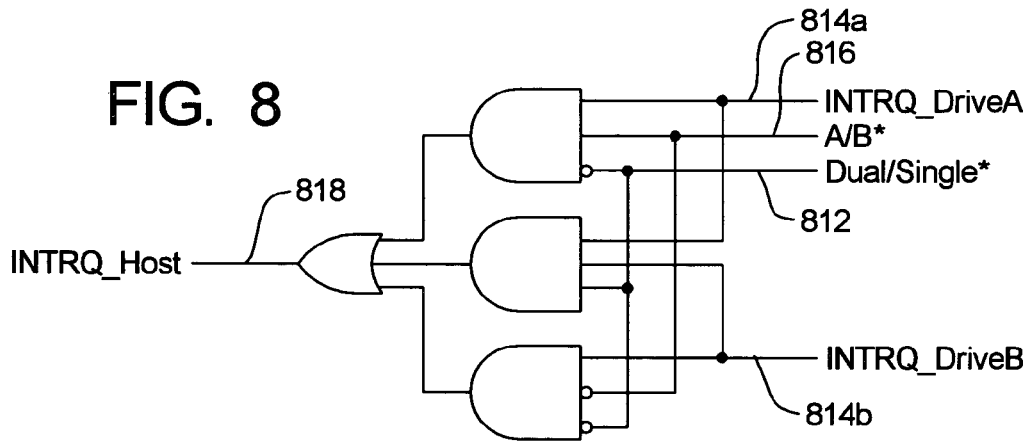
FIG. 8 is a logic diagram depicting control signals from drives to a host adapter according to an embodiment of the present invention.

In the illustrated embodiment, logic and control lines are also provided for signals sent from the drives to the host adapter. As shown in FIG. 8, when the Dual/Single* line 812 is high (normal dual mode), the interrupt request (INTRQ) lines from both drive A and drive B, 814*a*, 814*b*, are ANDed together. The INTRQ signal will only be sent to the host adapter if both drives assert INTRQ. When the Dual/Single* signal is low (single drive mode) 812, the logic then uses the A/B* signal 816 to direct only drive A or drive B INTRQ to the host adapter 818. Preferably, substantially all of the control signals that the drive sends to the host, such as direct memory access request (DMARQ) and IO ready (IORDY) are connected substantially in the same manner as INTRQ as illustrated in FIG. 8.

Figure 9:
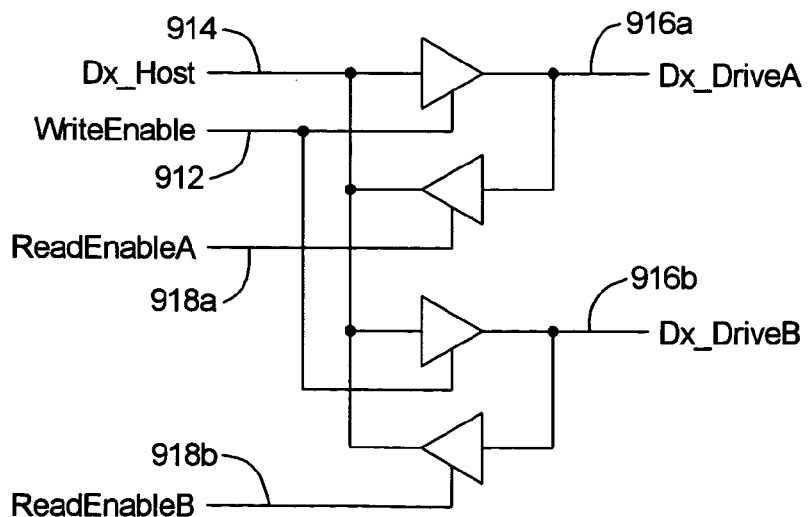
FIG. 9 is a logic diagram depicting data lines used to send sectored data between a host adapter and the drives according to an embodiment of the present invention.

In addition to handling the flow of control signals, preferably logic is provided in connection with data signals as well. In one embodiment, data lines indicated herein as d8-d15 are used to send sector data between the host adapter and the drives. FIG. 9 illustrates a manner of controlling these lines in accordance with one embodiment of the present invention. When host adapter sends sector data to the drives, the internal mirror logic state machine will turn-on the write enable signal 912. This signal then directs the data signals from the host adapter 914 to both drives 916*a*, 916*b*. When the host adapter reads data from the drives, the internal mirror logic state machine will turn on either the read enable A line 918*a* or the read enable B signals 918*b* (e.g., as described below) connecting the selected drive's data line to the host adapter.

Figure 10:
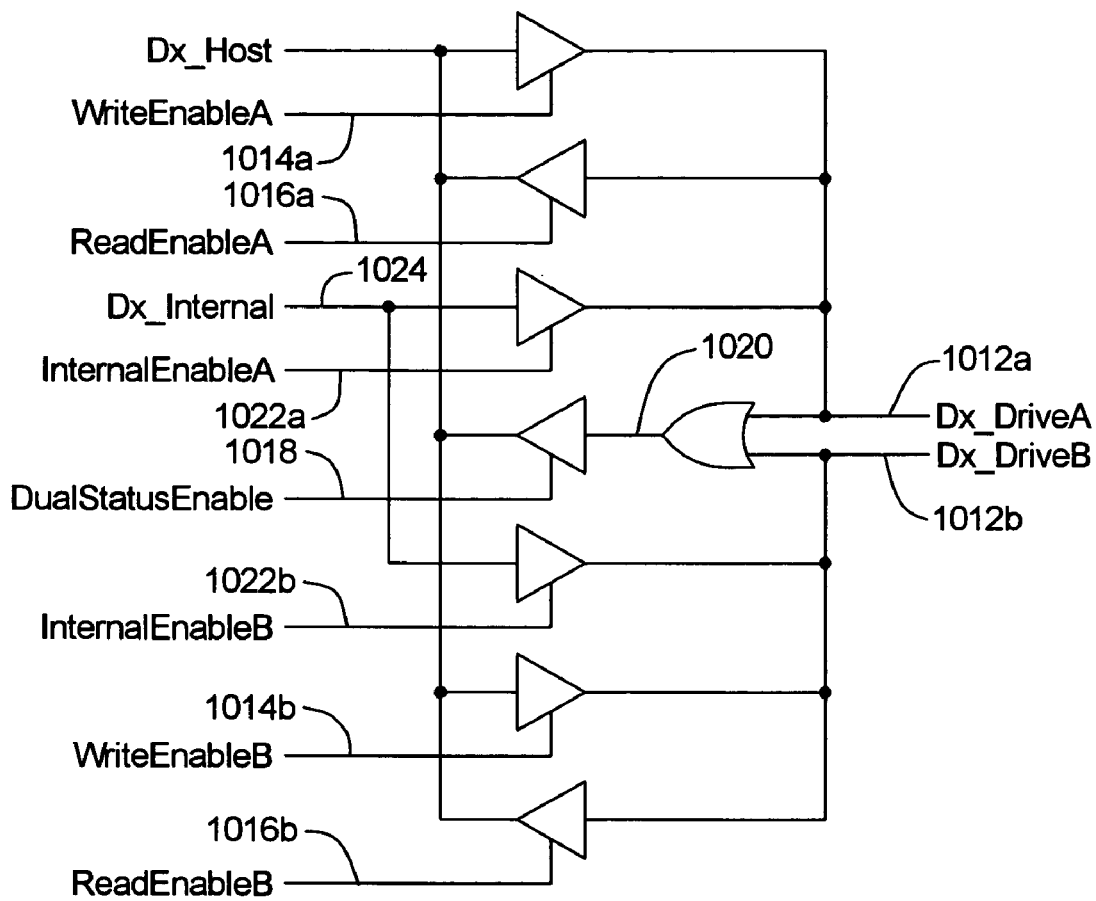
FIG. 10 is a logic diagram showing lines used to send command and control information, where control signals are ORed, according to an embodiment of the present invention.

In addition to sending sector data between the host adapter and the drives, data lines d0, d1, d2, d5 and d7 in the illustrated embodiment, are used to send command and control information. As shown in FIG. 10, the data lines from the two drives 1012*a*, 1012*b* are ORed together when the host adapter reads drive status.

When the Host Adapter writes sector data to the drives, the internal mirror logic state machine will turn on the WriteEnable A 1014*a* and WriteEnable B 1014*b* signals. These signals then direct the sector data signals from the Host Adapter to both drives. When the Host Adapter reads sector data from the drives, the internal mirror logic state machine will turn on either the ReadEnable A 1016*a* or the ReadEnable B 1016*b* signals. This will connect the selected drive's data line to the Host Adapter. When the mirror drive is in normal Dual mode and the Host Adapter read status, the internal mirror logic state machine will assert the Dual Status Enable signal 1018. This will direct the ORed Signals 1020 from both Drive A and Drive B to the Host Adapter. The reason that the signals are ORed together is that some signals like DO, which is used for the error signal, must be sent to the Host Adapter when either Drive A or Drive B sets this bit, as described below. If the mirror drive is in single mode, then the internal mirror logic state machine will turn on either the Read Enable A 1016*a* or the ReadEnable B 1016*b* signals. This will connect only the selected drive's data line to the Host Adapter. When the mirror drive is configured in Normal Dual "Safe Read Mode" and the Host Adapter sends a Read command, the internal mirror logic state machine will turn on Write Enable A 1014*a* and Internal Enable B 1022*b*. This will cause the Read command from the Host to go to Drive A and at the same time Drive B will receive a Read-Verify Command from the internal mirror logic state machine. The state machine drives the proper signal levels for the Read-Verify command onto the Dx_Internal line 1024. When the mirror drive is configured in Normal Dual "Fast Read Mode" and the Host Adapter sends a Read command, the internal mirror logic state machine will turn on both WriteEnable A 1014*a* and Write Enable B 1014*b*. This will cause the Read command from the Host to go to both Drive A and Drive B. The internal mirror logic state machine then monitors drive status and will return sector data from the first drive (the fastest one) that has data available by enabling ReadEnable A 1016*a* or ReadEnable B 1016*b*. When sector data is transferred, the internal mirror logic state machine will then turn on either InternalEnable A 1022*a* or InternalEnable B 1022*b* and send an abort to the slower drive. The state machine drives the proper signal levels for the Abort command onto the Dx_Internal line 1024. ReadEnable A 1016*a* and ReadEnable B 1016*b* lines direct sector and status data only to, or from, the selected drive.

Figure 11:
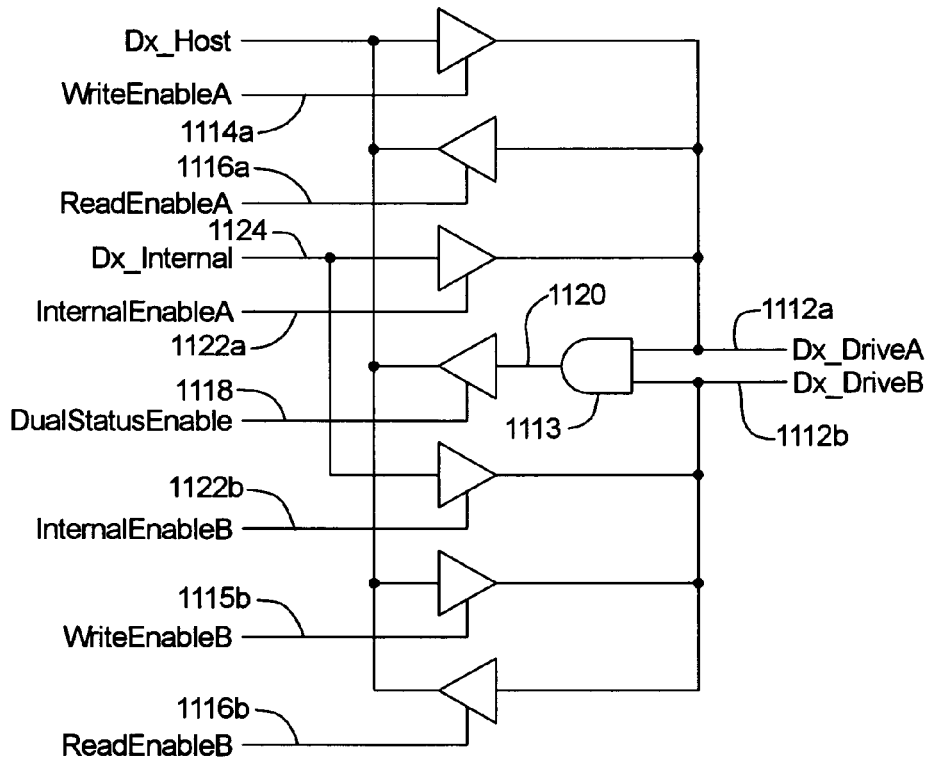
FIG. 11 is a logic diagram, similar to FIG. 10, but depicting ANDed data lines according to an embodiment of the present invention.

In addition to sending sector data between the host adapter and the drives, data lines d3, d4 and d6 are used to send command and control information to, and from, the drives. As shown in FIG. 11, data lines from the two drives 1112*a, b* are ANDed together 1113 when the host adapter reads drive status. When the Host Adapter writes sector data to the drives, the internal mirror logic state machine will turn on the WriteEnable A 1114*a* and WriteEnable B 1115*b* signals. These signals then direct the sector data signals from the Host Adapter to both drives. When the Host Adapter reads sector data from the drives, the internal mirror logic state machine will turn on either the ReadEnable A 1116*a* or the ReadEnable B 1116*b* signals. This will connect the selected drive's data line to the Host Adapter. When the mirror drive is in Normal Dual Mode and the Host Adapter reads status, the internal mirror logic state machine will turn on the DualStatusEnable signal 1118. This will direct the ANDed signal 1120 from both Drive A and Drive B to the Host Adapter. The reason that the signals are ANDed is that some signals like D3, which is used to indicate that data is ready, must be sent to the Host Adapter only when both Drive A and Drive B have data ready. If the mirror drive is in single mode, then the internal mirror logic state machine will turn on either the ReadEnable A 1116*a* or the ReadEnable B 1116*b* signals. This will connect only the selected drive's data line to the Host Adapter. When the mirror drive is configured in Normal Dual "Safe Read Mode" and the Host Adapter sends a Read command, the internal mirror logic state machine will turn on WriteEnable A 1114*a* and InternalEnable B 1122*b*. This will cause the Read command from the Host to go to Drive A and at the same time Drive B will receive a Read-Verify Command from the internal mirror logic state machine. The State machine drives the proper signal levels for the Read-Verify Command onto the Dx_Internal line 1124. When the mirror drive is configured in Normal Dual "Fast Read Mode" and the Host Adapter sends a Read command, the internal mirror logic state machine will turn on both WriteEnable A 1114*a* and WriteEnable B 1115*b*. This will cause the Read command from the Host to go to both Drive A and Drive B. The internal mirror logic state machine then monitors drive status and will return sector data from the first drive (the fastest one) that has data available by enabling ReadEnable A 1116*a* or ReadEnable B 1116*b*. When sector data is transferred, the internal mirror logic state machine will then turn on either InternalEnable A 1122*a* or InternalEnable B 1122*b* and send an Abort to the slower drive. The State machine drives the proper signal levels for the Abort command onto the Dx-Internal line 1124.

When the mirror drive is in Single Mode, the internal mirror logic state machine uses WriteEnable A 1114*a*, WriteEnable B 1115*b*, ReadEnable A 1116*a*, and ReadEnable B 1116*b* lines to direct sector and status data only to, and from, the selected drive.

Figure 12:
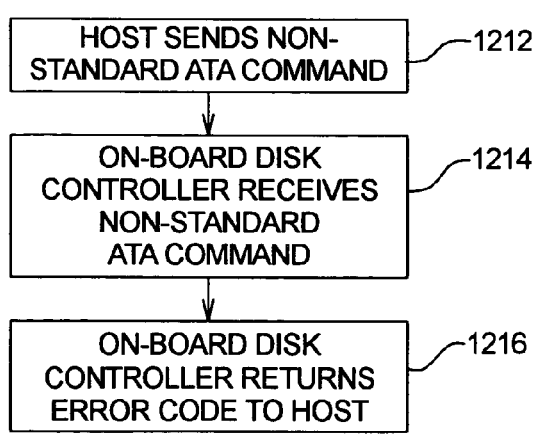
FIG. 12 is a flow chart depicting previous handling of non-standard commands.
Figure 13:
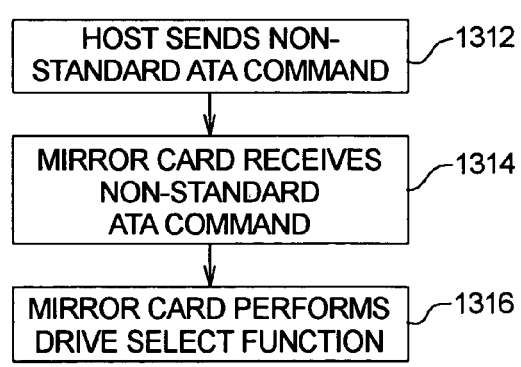
FIG. 13 is a flow chart showing handling of non-standard commands according to an embodiment of the present invention.

In at least one embodiment, the firmware involved in implementing embodiments of the present invention, including, e.g., firmware provided on some or all drive PCB's, preferably include extensions to the standard ATA command set. In one embodiment, the "advanced set features" (reserved codes) are used to pass ATA commands for special functions. In one embodiment, a drive select feature which indicates writes should be sent to both drives, to drive 1, or to drive 2, and signals which indicates reads comes from drive 1 or drive 2, or first drive ready, or last drive ready, are provided. As shown in FIG. 12, in previous approaches, when a host sends a non-standard ATA command 1212, and such command is received by an on-board disk controller 1214, the on-board disk controller would return an error code to the host 1216. As depicted in FIG. 13, according to an embodiment of the present invention, if the host sends a non-standard ATA command 1312, the mirror card will receive such non-standard ATA command 1314 and will perform the appropriate drive select function 1316. The drives themselves are configured to ignore such special commands (rather than, as in previous approaches, returning an error). This approach is especially useful since, in at least some embodiments, the mirror card (or other hardware) is only connected to the host by an ATA interface and, accordingly, it is necessary to use ATA-style commands in order to manage it.

In one embodiment, facilities are provided, preferably as part of the mirror card, to retain certain status information, preferably in a non-volatile manner. In one embodiment, an EEPROM 342 (FIG. 3) retains information about drive status and continues to retain such information even in the case of power-off. In one implementation, drive failure status is stored in 4 bits (a combination of drive 1, drive 2, read error and write error). In one embodiment, in order to provide a low risk of error, parity and/or redundancy are used in connection with storing the status information. The 4 bits provide 16 possible states. Preferably, after a power-on reset (POR) or other reset, the non-volatile memory sets the data and latches it. Following this initial action, the memory goes into a listening mode, where it saves any change in the status to the internal non-volatile memory. Those with skill in the art will understand that there are numerous ways for storing drive failure status information in a non-volatile fashion, and those will skill in the art will understand how to implement and use a number of such possible implementations.

Figure 14A:
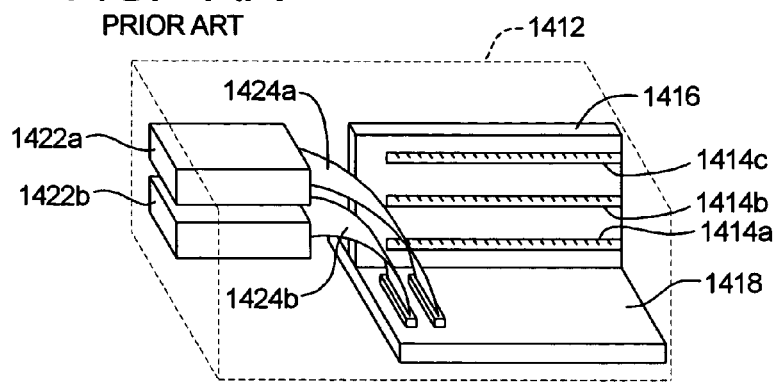
FIGS. 14A and 14B are schematic diagrams of selected interior components of a computer according to previous approaches.
Figure 14B:
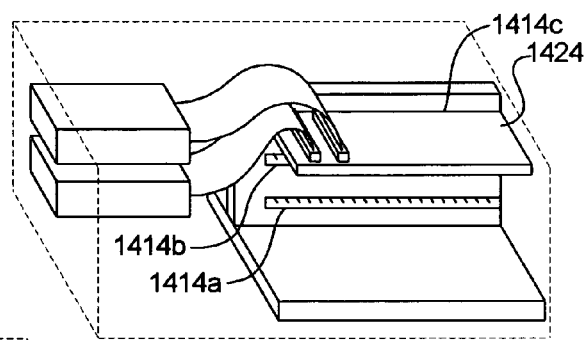

In addition to devices and techniques for achieving desired functionality as described herein, some aspects of the present invention also relate to physical configuration of components which can be used in accordance with embodiments of the present invention. As depicted in FIG. 14A, in previous devices, a personal computer or desktop computer chassis 1412 typically contained one or more PCI slots 1414*a*, 1414*b*, 1414*c*, sometimes positioned on a riser board 1416 coupled to a system board or mother board 1418, and sometimes positioned directly on the motherboard 1418. Often, one or more disk drives 1422*a*, 1422*b* were coupled, e.g., by ribbon cables, and the like, 1424*a*, 1424*b* to couplers on the mother board 1418. In at least some previous approaches, RAID functionality was provided on a card 1424 (FIG. 14B) coupled through one of the PCI slots 1414*c*.

Figure 15:
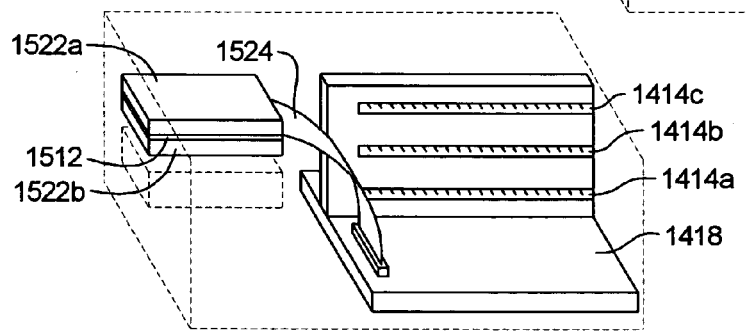
FIG. 15 is a schematic depiction of selected interior components of a computer providing RAID functionality according to an embodiment of the present invention.

According to one embodiment of the invention as illustrated in FIG. 15, rather than using one of the PCI slots 1414*a*, 1414*b*, 1414*c*, RAID circuitry is provided on a "mirror" card 1512 coupled, directly or indirectly, e.g., by a ribbon connector 1524, e.g., to a mother board 1418 and is not coupled to one of the PCI slots 1414*a*, 1414*b*, 1414*c*. Preferably, the mirror card 1512 is positioned substantially adjacent to and coupled electronically to, first and second disk drives 1522*a*, 1522*b*. In addition to avoiding the need for using one of the PCI slots 1414*a*, 1414*b*, 1414*c*, the depicted embodiment provides for a physically short signal pathway from the mirror card 1512 to the drives 1522*a*, 1522*b*. Providing a physically short data pathway is believed useful in reducing signal noise, especially in a context of relatively high data transfer rate procedures. Also, as shown in FIG. 15, the size, shape and placement of the mirror card 1512, and preferably some or all connectors associated therewith, combined with use of small Z-height disk drives preferably makes it possible to position the entire RAID system (two disk drives and RAID control circuitry and connectors) within a relatively small form factor, such as within the form factor for a single standard drive. In one embodiment, two reduced Z-height drives, such as 17 millimeter high drives, can be provided in a single standard 5.25 inch slot or form factor, (or CD ROM form factor) along with the integrated ATA mirror controller.

Figure 16:
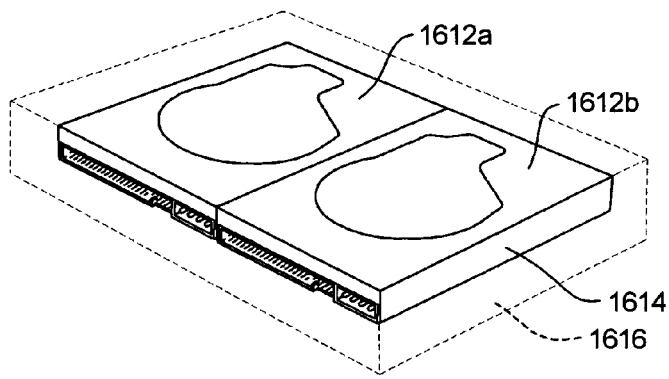
FIG. 16 is a perspective view depicting positions of two disk drives in a single drive form factor according to an embodiment of the present invention.

Preferably, according to one embodiment, two standard Z-height (e.g., 1 inch high) 3.5 inch drives and a RAID controller card or other circuitry can be configured to fit into two standard 5.25 inch form factor slots. In one embodiment, two 2.25 inch drives (9 millimeter or 12.5 millimeter Z-height) can be configured to fit into a standard 3.5 inch form factor. As depicted in FIG. 16, in one embodiment the drives 1612*a, b* are mounted side-by-side and rotated approximately 90 degrees with respect to the typical orientation (e.g., with a long edge of the drives 1614 parallel to the 3.5 inch side 1616 of the form factor). Thus, in the configuration of FIG. 16, the disks of the two drives will be substantially coplanar with one another. In one embodiment, modified or non-standard connectors are provided in order to achieve the desired form factor. For example, in one embodiment a modified cable extends substantially straight upwardly from the drive so as to take up substantially no additional space and allow the cabled drive to fit in a CD ROM slot. In one embodiment, the housing of ATA connectors is modified (compared to existing high volume ATA connectors) so as to expose the pins on the top side.

Figure 19:
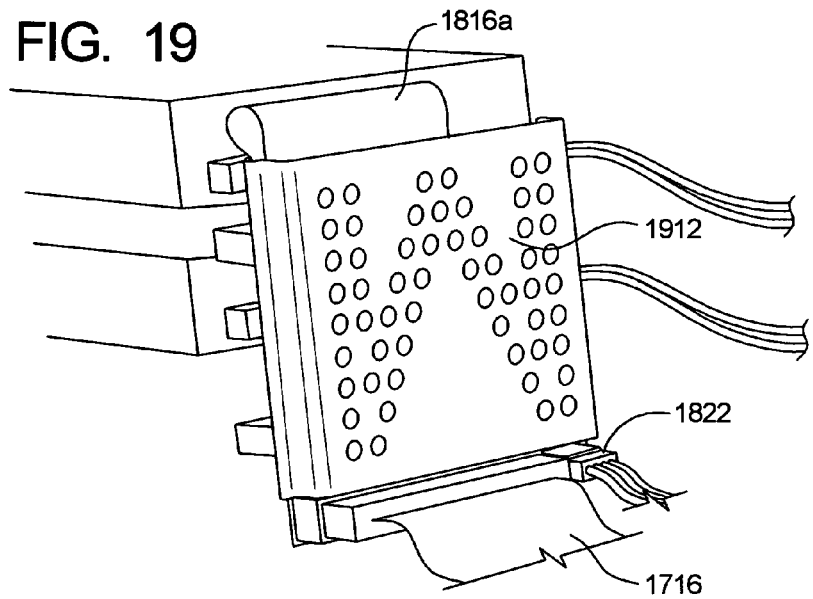
FIG. 19 is a rear perspective view of a protective shield for an interface card according to an embodiment of the present invention.

The present invention involves several approaches to mounting and/or coupling drives and/or RAID boards or other hardware, especially in a fashion to be consistent with one or more standard form factors or bay sizes. In one embodiment, as depicted in FIGS. 17*a* and 17*b*, two drives 1712*a*, 1712*b* are coupled to a mirror controller board 1714 by substantially rigid connectors 1716*a*, 1716*b* such as rigid 3-in-1 connectors. This configuration is believed to be particularly useful when driver connectors and drive-to-drive spacing is well-known. A ribbon connector 1716 and the like can be used for connection to the host 1718. Compared to at least some previous RAID approaches, this approach results in a relatively small card 1714 which is relatively inexpensive and provides for a short distance between the drives 1712*a*, 1712*b*, and the card 1714 such as less than 15 centimeters, preferably less than 10 centimeters. As noted above, the small drive-to-card distance is helpful in achieving desired signal quality, especially in high data transfer rate modes such as high UDMA modes 5 (100 Mb/s) and 6 (133 Mb/s). Card and drive power is supplied from a standard 12-volt/5-volt power supply cable 1722. A protective shield 1726, optionally with a handle 1728 (for installation and removal) can, if desired, be attached to the card such as by thumb screws 1724 or other screws or bolts, rivets, snapping and the like. The shield protects board components against damage and accidental shorting. In one embodiment, the shield can be substantially conductive and can be electrically connected to a ground, such as the card ground, with a low resistance connection, preferably serving as an electromagnetic interference (EMI) shield. Examples of rigid connectors 1716a, 1716b include standard 3-in-1 IDE (Integrated Drive Electronics) connectors and the like. In the embodiment depicted in FIGS. 18a and 18b, rather than using rigid connectors, a semi-stiff connector such as short ribbon cables 1816a, 1816b may be used. This approach is believed particularly useful when spacing in the drive bay is variable or connector geometry is variable. In one embodiment, two pairs of cables are used, two 80 conductor cables 1816a, 1816b to connect data lines, and two jumper block cables 1824a, 1824b. If drive-to-drive communication is not needed, the jumper block cables can be omitted in favor of simple jumpers on each of the drives and the card. Power is provided from the power supply directly to the drives 1826a, 1826b and power is supplied to the card 1822, e.g., via a floppy drive-power connector. The cables 1816a, 1816b are preferably as short as feasible for electrical performance and mechanical stability and mountability. The card 1714 can be protected with a shield 1912 (FIG. 19) against damage, shorting or RF emission. In the embodiment of FIG. 19, the shield 1912 is a snap-on shield. The shield can be made of a number of types of metal including steel, aluminum and the like, and can also be injection-molded or thermo-formed, e.g., when EMI is not an issue.

In one embodiment, features of the embodiments of FIGS. 17a, 17b, 18a and 18b are provided, such as providing one cable connection and one rigid 3-in-1 connection (the latter providing the card with a geometrically defined mounting). In configurations where it is useful that the data lines from the card to the drives be about the same lengths (especially, e.g., when longer cable or ribbon conductors need to be balanced with PCB traces) it may be necessary to provide one of the drives with serpentine or otherwise elongated PCB traces in order to balance signal pathway lengths.

According to one embodiment of the invention, two (or more) disk drives, e.g., for use in a RAID system, are mechanically coupled or combined, e.g., in such a manner that they can be treated, during an integration process, like one mechanical drive. In one embodiment, the invention provides what appears to be a physically larger single drive with higher performance and lower failure rate. Essentially this embodiment provides two drives with fail-over acting as one drive, preferably without the option to replace the failed drive or notification of single drive failure. Preferably, the drives are coupled so as to achieve a fixed drive-to-drive spacing.

Figure 20:
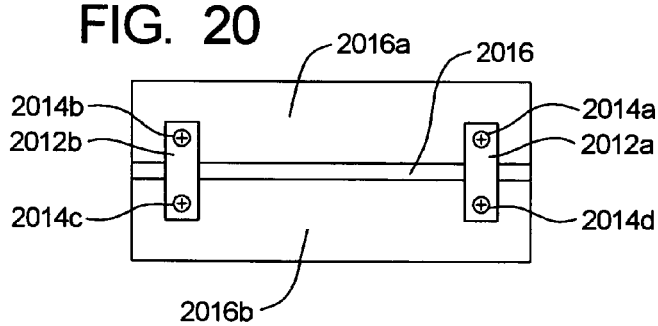
FIG. 20 is a schematic side elevational view of coupling of two drives of a RAID system usable in accordance with an embodiment of the present invention.

As depicted in FIG. 20, in one embodiment, clamps or straps 2012a, 2012b hold the drives 2016a, b together, e.g., with screws 2014a, 2014b, 2014c, 2014d. If needed and/or desired, the clamps or straps can be mounted in a recessed area, e.g., so that drive external dimensions do not exceed requirements (e.g., predefined form factors).

Figure 21:
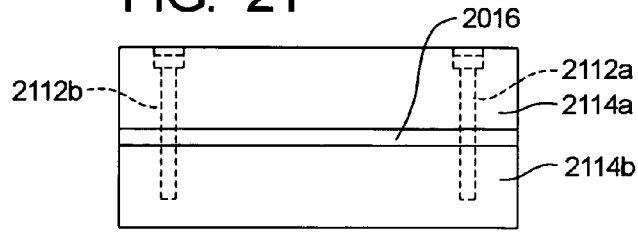
FIG. 21 is a schematic side view, partially in phantom, depicting coupling of two drives of a RAID system usable in accordance with an embodiment of the present invention.
Figure 22:
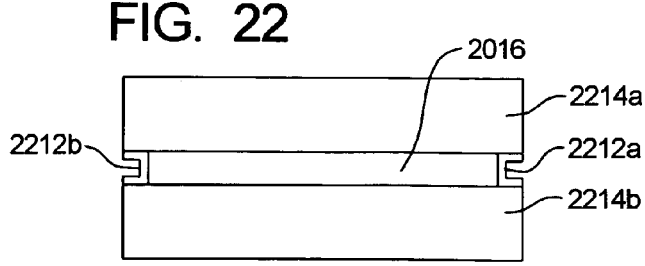
FIG. 22 is a schematic end view depicting coupling of two drives of a RAID system usable in accordance with an embodiment of the present invention.

In the embodiment of FIG. 21, bolts 2112a, 2112b or screws extend through holes substantially aligned in the drives 2114a, 2114b. In the embodiment of FIG. 22, the drives 2214a, 2214b are coupled by brackets (such as channel-shaped brackets) 2212a, 2212b (e.g., sheet metal or injection-molded plastic). Coupling to the drives 2214a, 2214b can be by any and a number of means including screws (using screw holes on the bottom sides of drive base plates), bolts, rivets, adhesive, welding, brazing, snap connections, and the like. In one embodiment, the drives 2214a, 2214b are positioned in a face-to-face or back-to-back relationship, e.g., with PCB surfaces or the like, adjacent one another. Depending on the configuration of screw holes and the like, it may be useful to split and/or shift portions of brackets, straps or the like to achieve lateral match. In some embodiments, it may be desired to combine features from FIGS. 20, 21 and 22, such as providing for brackets as shown on FIG. 22 and straps or snaps (for attaching, e.g., the backwalls). As will be understood by those with skill in the art, components may be configured to provide for ease of fabrication (e.g., providing captive screws for easy installation). Often, drive bays for multiple drives have short bends at right angles to support the drives. Brackets as depicted in FIG. 22 can be made to fit standard spacing or can be made adjustable so that the attached drive clears such bends. According to one embodiment of the invention, drives mounted in close proximity are configured as low power consumption drives so that the drives can be closely combined without causing a problem due to increased heating. Although in FIG. 22, the brackets are depicted substantially between the drives, it is possible to attach brackets around the drives. In some embodiments of the invention, a soft and/or resilient material, such as a plastic or felt pad 2016 can be squeezed or otherwise mounted between the two drives, e.g., to mechanically decouple the two drives.

In one embodiment, one or preferably all, drives of a RAID system are configured to facilitate removability, preferably so that a drive can be readily removed without the need for opening a personal computer chassis. Such removability can provide a number of advantages. It can make it easier for users to replace or upgrade drives (since it is believed, many users are reluctant to open a PC box or chassis). Removability can also be useful when it is desired to provide for routine removal of drives, e.g., for security purposes (e.g., for locking in a safe overnight, and the like). Easy removability can also be useful when it is desired to provide for so-called data cartridge functionality (for example, to allow users to readily insert purchased or rented disks containing movies, music and the like). Removability provides a user with an option to, for example, purchase extra drives, e.g., for keeping one drive in reserve to ensure data recovery and the like.

Figure 23:
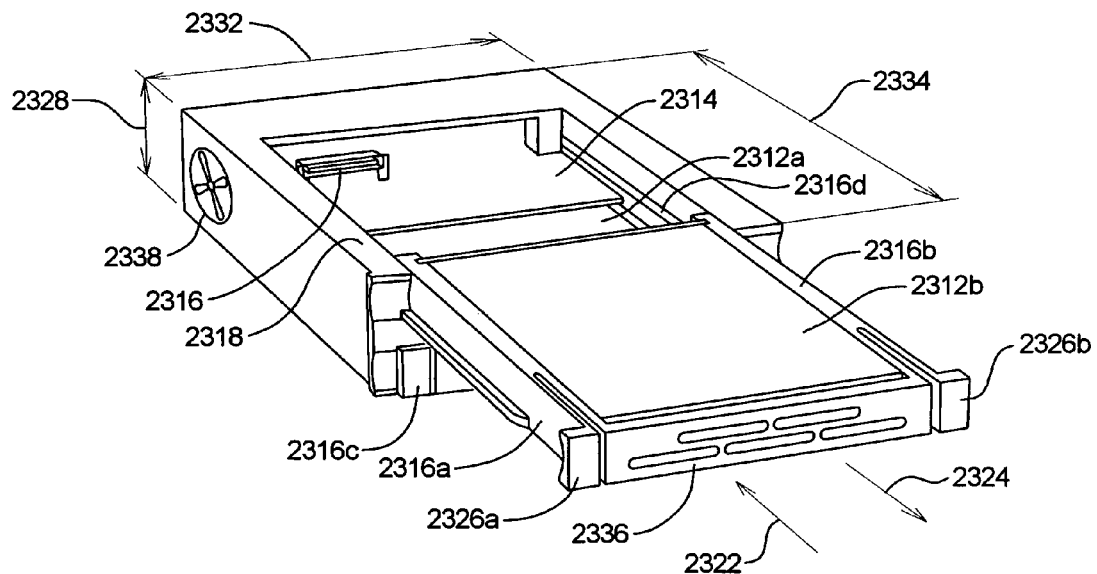
FIG. 23 is a partially exploded view of two couplable drives of a RAID system usable in accordance with an embodiment of the present invention.
Figure 24:
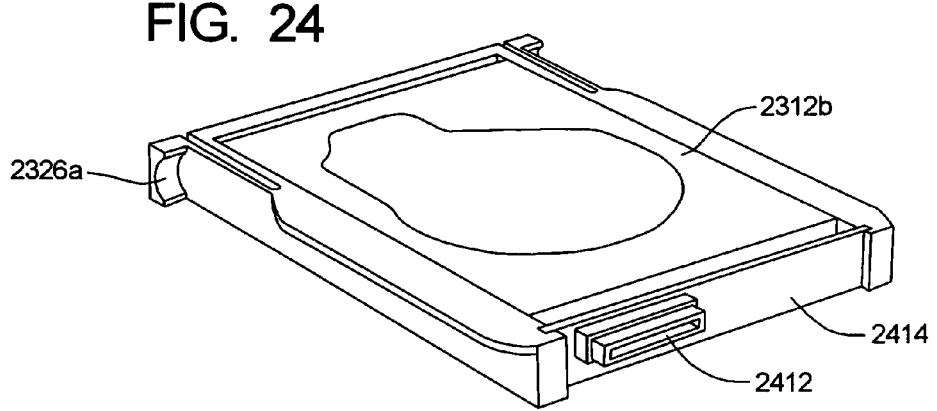
FIG. 24 is a rear perspective view of one drive and frame which can be used in accordance with the embodiment of FIG. 23.
Figure 25:
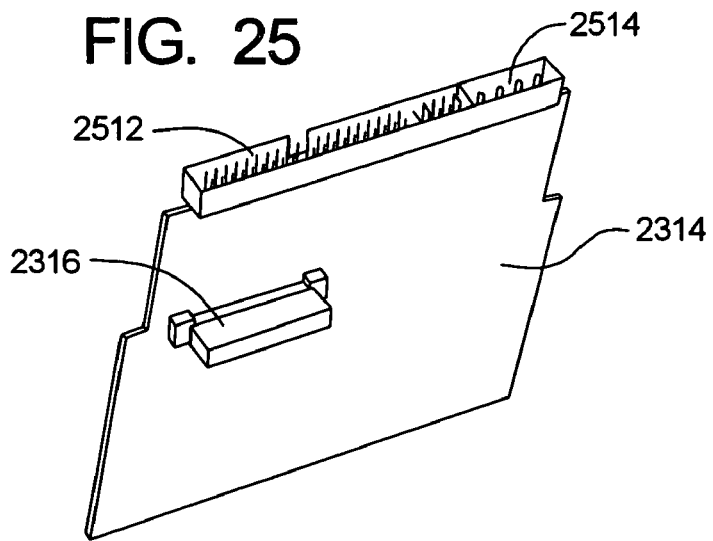
FIG. 25 is a rear perspective view of a bridge or interposer card which can be used in accordance with the embodiment of FIG. 23.
Figure 27:
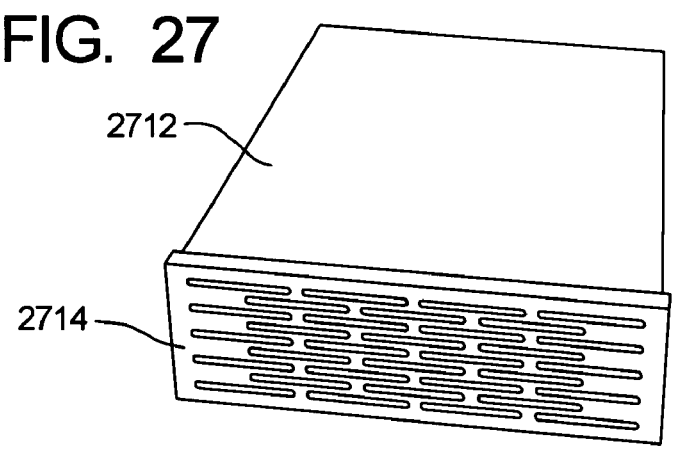
FIG. 27 is a front perspective view of an enclosure for two drives of a RAID system according to an embodiment of the present invention.

As depicted in FIG. 27, in one embodiment, a cartridge-style mirror device (FIG. 23) includes two drives 2312a, 2312b such as 17 millimeter high drives, connected to a single mirror card 2314. Each drive as depicted in this embodiment, is connected by a low insertion force connector 2316 mounted to opposite sides of the mirror card 2314. In the depicted embodiment, the drive 2312a is coupled to rails 2316c, 2316d, while drive 2312b is coupled to rails 2316a, 2316b. The rails 2316a, 2316b, 2316c, 2316d movably, preferably slidably, engage with a slot or similar feature in a frame 2318 to permit movement of the drives 2312a, 2312b into 2322 or out of 2324 mechanical and/or electrical engagement with the frame 2318 and/or mirror card 2314. The mirror drive couplers 2316 engage with corresponding low insertion force couplers 2412 (FIG. 24) on the drive 2312b, e.g., low insertion force 50 pin and/or 68 pin drive bay connectors. In the depicted embodiment, the mirror card 2314, as shown in FIG. 25, includes connectors 2512, 2514 for coupling to the host device. Preferably a resilient latch 2326a, 2326b (FIG. 23) engages a corresponding detent in the frame 2318 to retain the drives 2312a, 2312b in an engaged position. Preferably the device has a height 2328, width 2332 and/or depth 2334 such that the entire device, preferably including couplers, fits within a predefined form factor such as a 5.25 inch (CD ROM) bay size or form factor. A front surface of the rail structure preferably includes vents 2336 which, in combination with an optional rear vent or a fan 2338 provides for cooling. In at least some embodiments, it is desirable to have the capability to use at least some previously available or "off the shelf" drives 2312*a*, 2312*b*. When the drives 2312*a*, 2312*b* are configured for using standard ATA couplers, it is preferred to provide each drive with an interposer board 2414 (FIG. 24) which receives the ATA connectors on a surface adjacent the drive 2312*b*, and contains the low insertion force couplers 2412 on the opposite surface as depicted.

Figure 26:
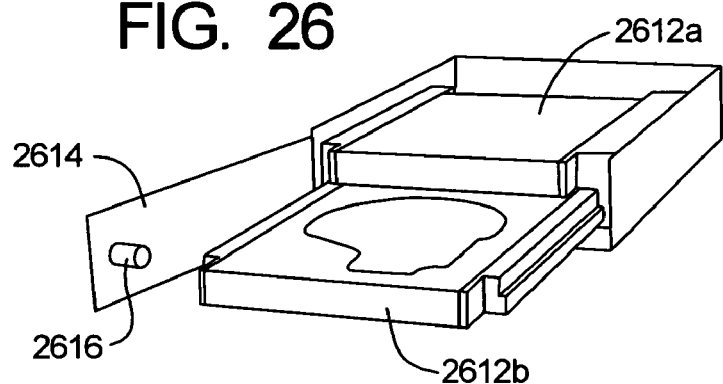
FIG. 26 is a front perspective view of a frame and two drives of a RAID system with removable drives.

In the embodiment depicted in FIG. 26, the removable drives 2612*a*, 2612*b* are at least partially covered by one or more doors 2614 preferably provided with a locking device 2616, e.g., to restrict access and prevent a drive from being easily removed from a system by an unauthorized person.

In another embodiment, depicted in FIG. 27, the RAID system drives (not shown) are mounted within a substantially closed box 2712 which may optionally have vent openings 2714 as described above. In one embodiment, the appearance and/or operation of the RAID system is transparent to the user, appearing to look and/or operate like a standard single-drive component (but preferably providing substantially enhanced data integrity, security or performance such as providing an increase in reliability of approximately 100 times in the first year, and approximately twenty time after five years). In one embodiment, the user does not need to take any action (or, in some embodiments does not even need to receive notifications) for achieving RAID functionality. In some embodiments, some or all of the RAID functionality or performance enhancement can be achieved without substantial involvement of, or notification to, the host system.

When the drives, such as 3.5 inch form factor drives, or the like, particularly for ATA drives, are used as a data cartridge, providing for low insertion force connectors, e.g., as described, it is believed to provide greater ease of use as well as enhanced reliability (compared to standard ATA and/or Molex connections). In one implementation, the described ramp-load and/or low insertion force connectors are combined with shock and/or vibration absorbing or damping materials. In one embodiment, a substantially resilient rubber elastomer or plastic material fully or partially covers the drives, e.g., to increase robustness of the system. By providing for robustness, reliability and ease of use in connection with a removable 3.5 inch ATA or other drive, it is believed such user removable drives are feasible for uses now fulfilled by removable media such as optical disks, tape drives, and the like.

Figure 28:
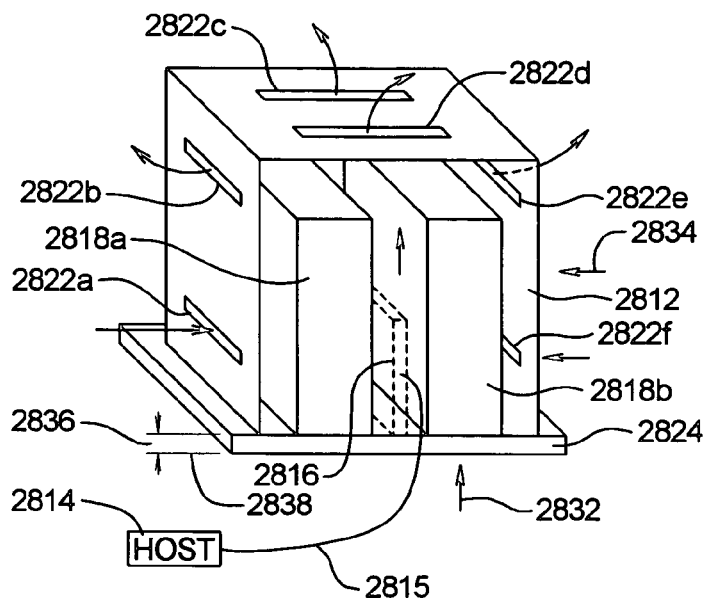
FIG. 28 is a perspective, partially cut-away, view of a external drive housing of a type which can be used for a RAID system according to an embodiment of the present invention.
Figure 29:
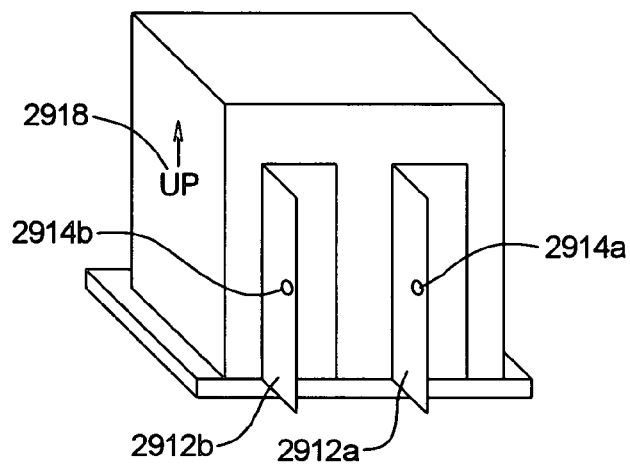
FIG. 29 is a perspective view of a housing which can be used for one or more components of a RAID system according to an embodiment of the present invention.

In one embodiment of the invention, disk drives, such as disk drives used in connection with a RAID system, are provided in an external box (i.e., external to the personal computer or desktop computer chassis or "CPU" unit). Such an external device can be used as main storage, backup storage, home server or the like. It is believed that such an external RAID or disk drive box provides for ease of installation, since it does not require opening a PC chassis. Although external boxes can be used in connection with many types of disk drives, they are believed particularly useful in connection with high speed disk drives (such as 7200 rpm drives or more). As depicted in FIG. 28, the external drive box 2812 is preferably coupled to a host device such as a host computer 2814 by one or more cables 2815. A number of data transfer cables and technologies can be used including Firewire, universal serial bus (USB), Ethernet, serial ATA, SCSI, wireless Ethernet 802.11, SATA, and the like. In one embodiment, a RAID card 2816 includes a bridge chip for translating the external interface signal to parallel ATA. It is believed that use of parallel ATA facilitates achieving desired RAID functionality at low cost such as providing at least some functionality using (relatively low-cost) gate arrays and the like as described herein. In the embodiment depicted in FIG. 28, the drives 2818*a*, 2818*b* are not necessarily configured to be easily user removable (such that, in case of failure, a replacement extend drive would typically be installed). In the embodiment of FIG. 29, one or both drives may be user-removable (e.g., using features similar to those described in connection with FIGS. 23-26) which may have restricted access such as by providing one or (in the embodiment of FIG. 29) two doors 2912*a*, 2912*b* preferably with locks 2914*a*, 2914*b*. Preferably, the drives are mounted vertically (i.e., with a long axis of the drive vertical and, typically with the plane of the disks substantial vertical). Mounting the drives vertically provides, preferably in conjunction with one or more vent openings, 2822*a-f* (FIG. 28), a convective or chimney effect which can help with desired cooling. In one embodiment, convective cooling substantially suffices, even for relatively hard-to-cool drives (such as 7200 rpm drives, 10,000 rpm drives and the like), preferably without the need for a fan (e.g., in order to reduce noise, power and/or increase reliability and lifespan). Preferably the box 2812 is provided with features to encourage maintaining the vertical orientation (or discourage an orientation other than the desired orientation) such as by providing a somewhat enlarged base area 2824, providing indicia 2918 (FIG. 29) and the like. It is believed that vertical orientation of the drives is also useful for reducing damage due to shock. It is believed that shock in a direction parallel to disks of the vertical drives 2832 (FIG. 28) is more readily tolerated than shock in, e.g., the Z-direction (with respect to the drives) 2834. Furthermore, in the depicted orientation, both drives are relatively close to an adjacent surface 2838. In a horizontal arrangement, typically at least one, and often both, drives will be positioned farther from an adjacent support surface 2838 than the distance 2836 illustrated in FIG. 28. Nevertheless, it is also possible to provide embodiments of the present invention with an external box having one or more of the drives in a substantially horizontal configuration.

Figure 30:
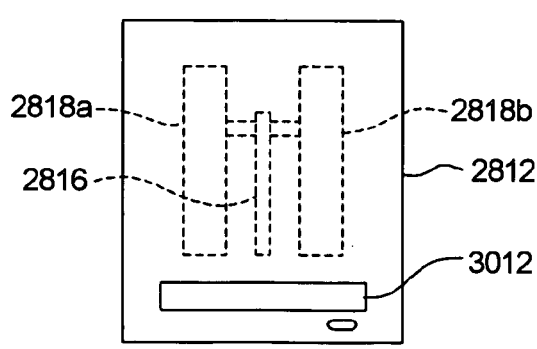
FIG. 30 is a front elevational view, partially in phantom, of a housing for a component which can be used in connection with a RAID system according to embodiments of the present invention.

As depicted in FIG. 30, in some embodiments the external box 2812 may be provided with additional devices such as a CD ROM player/writer or DVD player/writer 3012. In a number of contexts (especially in embodiments providing for drive removability and/or in the case of an external box), data encryption is preferably provided. In one embodiment, a data encryption key is programmed into the mirror card gate array. All data to the drive are XORed with this key in the gate array. To access and read the data, both the drive and the box encrypt and decrypt the data in this manner. If desired, another key can be stored in the computer so that all three are needed for data access. In some embodiments, a flash card and flash card reader could provide an additional key. By providing such a security feature, a drive removed from a system (or an external box removed from a system) could not have its data readily read on another system.

Figure 31:
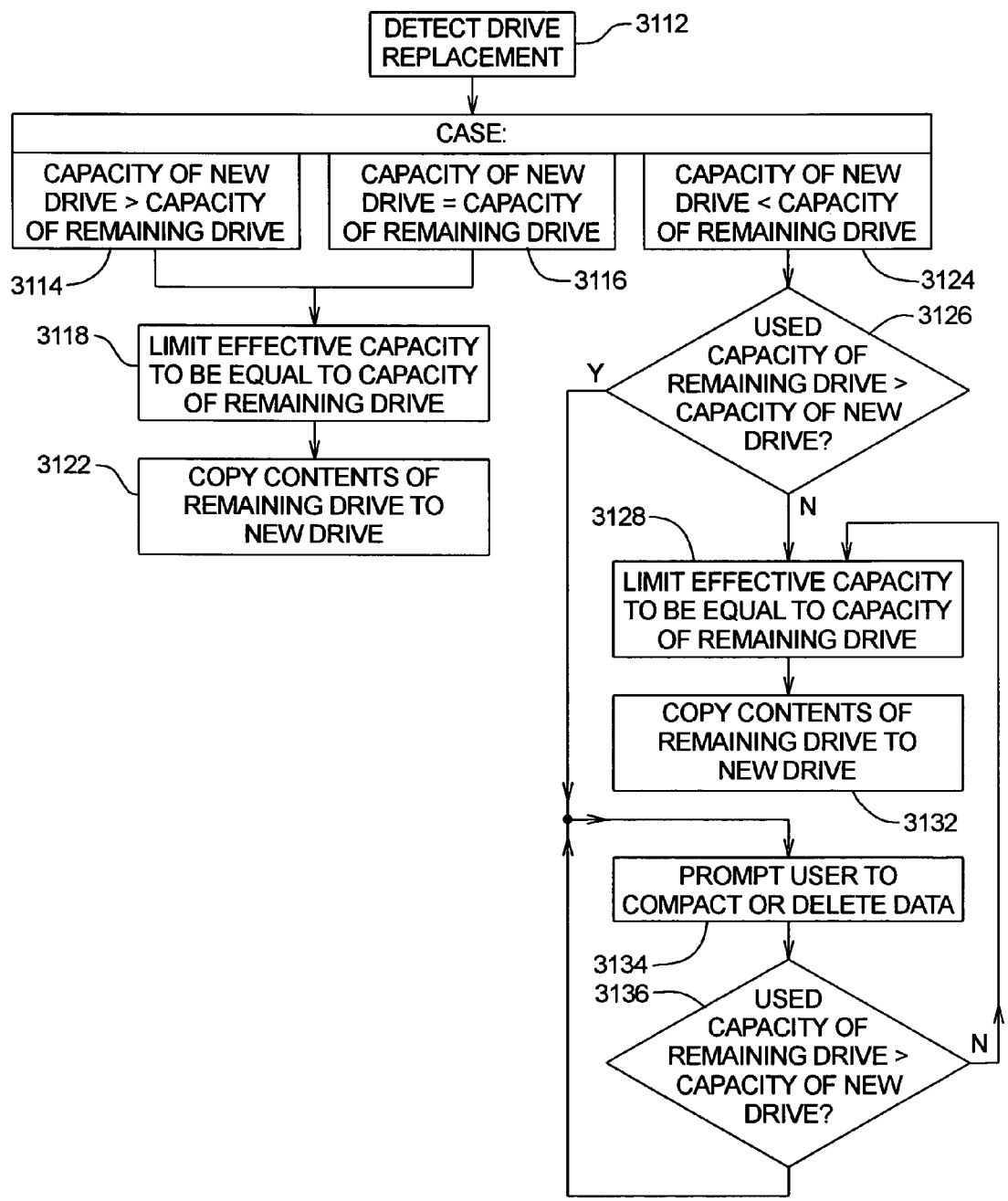
FIG. 31 is a flowchart for a procedure usable in connection with a drive replacement according one embodiment of the present invention.

When a drive of a RAID system is replaced (because of repair or upgrading or in a "data cartridge" type of application), it is often desirable to copy substantially all data from the unreplaced drive to the replacement drive (e.g., to reestablish a RAID system and/or to implement a data copying procedure). According to one embodiment of the present invention, procedures are provided to accommodate a situation in which the storage capacity of the replacement drive is different from the storage capacity of the unreplaced (source) drive. To detect when a new drive is installed, the system checks the format (partitioning) of both drives at start-up. When the system detects that one of the drives is unformatted, the system will prompt the user preferably to determine whether the user wants to copy one drive to another. The system preferably offers the correct copy direction based on the format information. As depicted in FIG. 31, after the replacement of the drive is detected 3112, subsequent copying procedures or other procedures may depend on the relative size of the replaced drive. The value of the drive size is reported to the host when the system issues an ID command. In the embodiment of FIG. 31, if the capacity of the replacement (new) drive is greater than the capacity of the remaining (unreplaced) drive 3114, or is equal to the capacity of the remaining drive 3116, the system preferably limits the effective capacity of the new drive to be equal to the actual capacity of the remaining (unreplaced) drive 3118. In one embodiment, the application sends a command to determine the maximum logical block address (LBA) of both drives. In one embodiment, the system sends a maximum LBA limiting command to the larger drive. For example, if an original system has two drives each with a capacity of 20 GB and a 40 GB replacement drive is installed, the capacity of the new system will still be effectively 20 GB. At some later point, if another 40 GB drive is installed in place of the smaller 20 GB, the system will automatically be configured as a 40 GB system.

If the capacity of the new (replacement) drive is less than the capacity of the remaining drive 3124, the system determines whether the actually used capacity of the remaining drive is greater than the capacity of the new drive 3126. If not, the system may merely limit the effective capacity of both drives to be equal to the capacity of the new drive 3128 followed by copying contents of the remaining drive to the new drive 3132. However, if the used capacity of the remaining drive is greater than the capacity of the new drive, the system preferably prompts the user to compact or delete data (or, optionally, performs compaction automatically). In addition or in place of compaction, defragmentation may be used to consolidate logic block addresses. If the system cannot be reduced to the new drive capacity using consolidation, defragmentation and the like, the user is preferably encouraged to delete data (or obtain another, larger drive). If the used capacity in the remaining drive is less than the capacity of the new drive, following compaction or consolidation 3136, the system will limit the effective capacity to be equal to the capacity of the new drive 3128 before copying the contents of the remaining drive to the new drive 3132.

Figure 32:
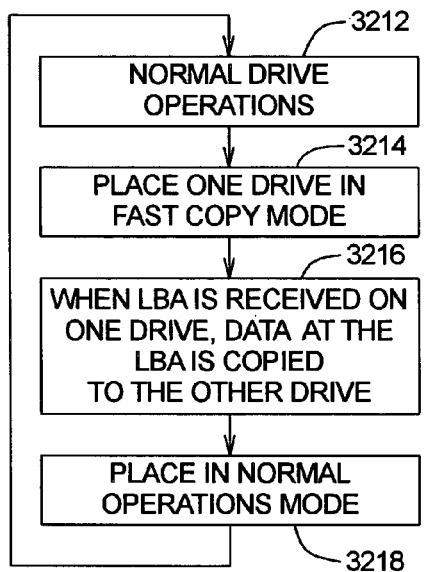
FIG. 32 is a flowchart for a procedure usable for a copying process according to an embodiment of the present invention.
Figure 33:
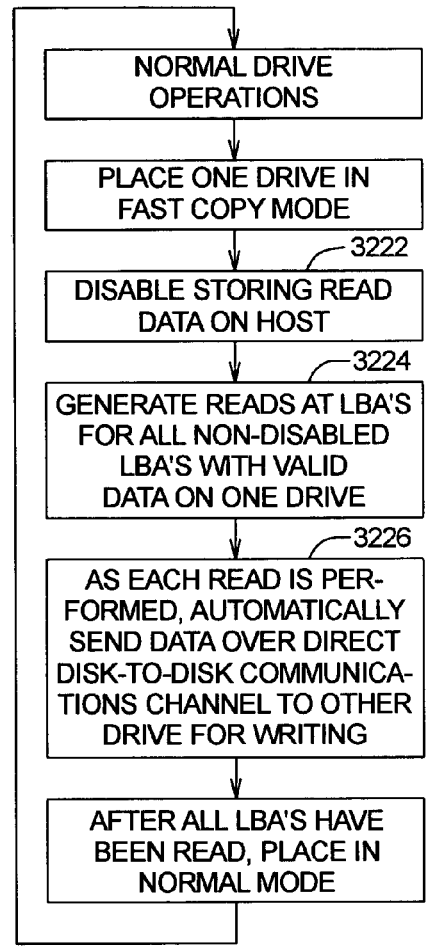
FIG. 33 is a flowchart of a procedure usable for copying according to one embodiment of the present invention.

In situations of drive replacement, or in other situations where it is desired to copy from one drive to another, embodiments of the present invention can be used to achieve a relatively fast copy operation. As depicted in FIG. 32, when it is desired to switch from normal drive operations 3212 to place the system in a fast copy mode 3214, preferably a command for fast copy is written to the gate array. In this mode, when an LBA is received on one drive, the data is copied to the other drive 3216 without the need to use the system (host) memory as a buffer. Preferably as depicted in FIG. 33, the system is disabled from the storing of read data on the host 3222. The host generates and sends LBA's to the source drive. If desired, the system may be configured to generate only those LBA's which are non-disabled and/or which have valid data 3224. Preferably as depicted in FIG. 33, as each read is performed, the system automatically sends data over a "back channel," (substantially disk-to-disk communications channel) for writing on the new disk.

In one embodiment of the present invention, "back channel" communication is achieved by connecting the serial ports of the drive PCB's (generally, serial ports of the ASICs of the two drives) in a manner that one drive can request data from the other. By connecting serial ports of the ASIC of two drives, one drive can request data from the other drive. For example, in one embodiment, if the first drive is selected for a read based on a first drive ready and that drive fails to read based on a error condition, optionally after beginning a retry loop (adjusting read current, off-tracking and other physical retries), drive 1 sends a serial port request to drive 2 for the LBA that caused the error. Preferably, if the data is received it will perform a write verify and proceed to serve the data requested from the host. In this manner, preferably, many potential "errors" can be fixed in such a way that the host is never made aware of a bad status bit. It is believed to also increase the reliability of the system because drives are constantly fixing each other.

In one embodiment, back channel communication uses drive-to-drive RS232 communication provided via the jumper block 1824a, 1824b (FIG. 18A). The RS232 output line on each drive is connected, possibly via traces on the mirror board to the RS232 input line on the twin (other) drive. Because there is no need to use system memory as a buffer, the process is considerably more rapid than non-back channel copies.

Figure 34A:
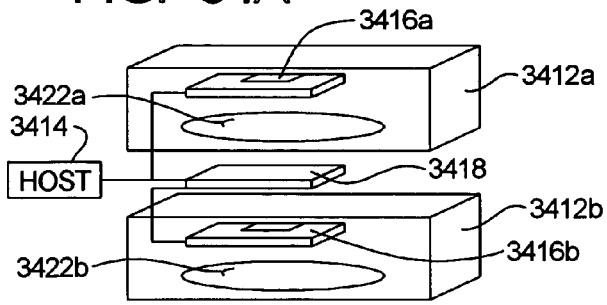
FIG. 34A is a schematic depiction of two drives coupled to a host usable in connection with an embodiment of the present invention.
Figure 35A:
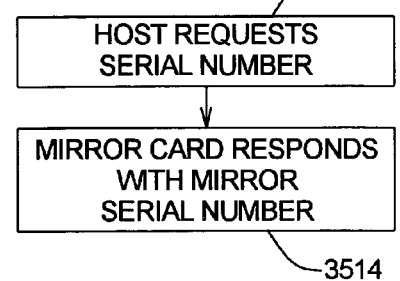
FIG. 35A is a flowchart of a mirror serial number procedure usable in accordance with an embodiment of the present invention.

Replacement of a drive in a RAID or other multi-drive system can raise issues related to security. Certain operating systems use drive serial numbers to generate a security key. If the system detects that software has been copied to a new drive (because the security key generated from the serial number of that drive does not match the key based on the original serial number at the time of the operating system install), the software will fail to run (as an anti-piracy device). For example, as depicted in FIG. 34A, each of the drives 3412a, 3412b connected to a host 3414 may have an unique serial number, e.g., encoded in the drive PCB 3416a, 3416b. According to an embodiment of the present invention, the RAID system embodied in the mirror card 3418 causes a second "mirror" serial number to be stored with respect to (and preferably on) each of the two disks 3422a, 3422b (preferably on a normally unreadable portion of the disk). As depicted in FIG. 35A, when the host 3414 requests a serial number 3512, the mirror card 3418 responds 3514 with the mirror serial number 3422a, 3422b. Accordingly, even after a drive 3412a or 3412b is replaced (and data is copied from the remaining drive), the system will continue to receive the mirror serial number and the software on the system will continue to execute, whether it is stored on the original drive or a replacement drive, as desired. Accordingly, embodiments of the present invention preferably allow anti-piracy procedures to operate properly while preventing a situation in which anti-piracy features can prevent the legitimate use of software under a RAID system.

In addition to copying in response to a disk replacement or similar event, RAID systems desirably contain features for normal mirroring of writes (such that data stored on one disk is also stored on at least one other disk of the RAID system). According to one embodiment of the invention, data mirroring is provided in a context which permits mirroring to be suspended or delayed, at least in certain situations.

As depicted in FIG. 34B, a system may normally be operating in a mirroring mode 3432 in which any data sent to the RAID system for writing, is written to both disks. However, the mirroring may be suspended in response to certain suspension triggers 3434. In one embodiment, a suspension trigger is initiated by a user, e.g., clicking on a "hold-off mirroring" button. In this embodiment, in order to suspend mirroring, a command is sent to the mirror card gate array in order to route writes and reads to only one drive (e.g., the "primary drive"). In various embodiments, this can always be the same drive, or the system can alternate between drives on subsequent hold-off mirroring calls, or a selection can be made based on recent error performance recorded by the software or as selected by a user. During suspension, all logical block address requests are passed through a low-level driver in the driver stack. Preferably, the driver records all LBA's (i.e., the addresses where data is written) and these addresses are written to a table. In one embodiment, the table can be written in erasable memory and can be written to the primary drive during periods of inactivity. After the system is in the suspend mirroring mode 3436, at some point, a mirror trigger will occur 3438. In an embodiment in which suspension was triggered by a user input, remirroring can also be triggered by user input. In another embodiment, suspension is triggered by receipt of a certain data type, such as data types which are recognized as being relatively susceptible to harboring viruses, data types associated with certain sources (e.g., internet data, e-mail attachment data and the like). Remirroring can be triggered by the conclusion of the receipt of such suspect data. In other embodiments, remirroring may be triggered by passage of a predetermined amount of time or after scanning data for the presence of a virus. Upon the occurrence of the remirror trigger 3438, preferably data is copied to the second drive as needed to reestablish the mirror 3442. Such remirroring can be achieved when the application reads the list of the changed LBA's (previously stored in a table and/or stored on the drive) and copies the contents of the primary drive, which are stored at the table addresses, onto the second drive. The system is then placed back in normal mirroring mode 3432. In case, for some reason, the LBA list is not available or retrievable, it is still possible to remirror by copying the entire disk onto the second drive.

In some embodiments, rather than automatically copying data 3442, the system may be configured, e.g., in response to a user choice, to reverse write operations which occurred during the suspension. For example, if, during the suspension, it is determined that items written to the first disk may, or do, contain viruses or are otherwise undesirable, it will not be desired to make yet another copy of such infected files onto the second disk. Instead, preferably, the potentially infected data is erased from the first disk. In one embodiment, a user is offered an option (e.g., by clicking on an icon or the like) to copy all data whose LBA's are in the table from the second drive back to the primary drive (or a complete copy is made of the second drive onto the primary drive).

In another embodiment, the RAID system is provided with (or can be selected or commanded to perform) delayed mirroring operations. In one embodiment, mirroring is automatically time-delayed by the system. Such time-delay preferably provides an opportunity to scan for, or detect, viruses during the delay time period, before such viruses can infect both drives. As depicted in FIG. 35B, according to the delayed mirroring, data sent to the RAID system is first written to one of the two drives 3516. Following this, there is a delayed period preferably of a predetermined duration 3518. The delay period may be user selected, may be based on performance parameters, may be based on type or source of data and the like. Preferably, during the delay period 3518, virus detection or other data or system checks are performed 3522. After the expiration of the delay period (at least if no viruses or other problems are detected), the data is then copied to the other of the two drives 3524. As described below, some embodiments can use the presence of two or more copies of data to achieve enhanced performance. However, when a system has delayed or suspended mirroring, some performance enhancement cannot be achieved, at least during the time of such delay or suspension and at least with respect to the suspended or delayed data. In one embodiment, remirroring of data is done by way of transfer of data from one drive to the other by the back channel, described above.

In at least some RAID systems, the second copy of data performs the role of a data backup or disk backup, such that, if the desired data cannot be obtained from the primary drive, the user can retrieve the data from (or switch operation to) the backup drive. However, in such system, the error on the primary drive which caused the retrieval from the backup drive still remains and, in at least some systems, correction of the error must be done manually by the user (such as by copying a file from the backup disk to the primary disk). Furthermore, there is a potential, in at least some previous systems, of a latent RAID error. A latent RAID error can occur, e.g., when data is written to more than one drive but only (normally) read from one of the drives. If the drive that is normally never read (e.g., a backup drive) develops a bad LBA, then the user will not know about such bad LBA (since that disk is normally not read) until such time as the primary drive develops an error at the same location. In this event, however, the data is unrecoverable since corresponding LBA's are corrupted on both drives.

According to one embodiment of the invention, the presence of copies of data on a RAID system is exploited to correct errors, preferably in a manner which can avoid latent RAID errors and, preferably, with little or no input required from (or, in some embodiments, notification provided to) the user. In general, as depicted in FIG. 36, following a period of normal drive operations 3612, if an error is detected on a drive 3614, optionally following data retries and/or one or more types of error correction code (ECC) 3616, the system obtains the data from the drive that did not have the error 3618 and writes that data onto the drive that had the error 3622.

In one embodiment, error correction involves error detection of a type which can be at least partially obtained using a drive self-test (DST) process, and preferably a so-called smart DST (self-monitoring analysis and recording technology). In general, smart DST, through continuous or periodic checking, allows for a certain increase in reliability. However, in general, smart DST, although it might suffice to find a hard-error, in general cannot fix such an error. When DST is turned on (generally through a host command from an application), the drive automatically goes into a self-scan mode, typically after a certain amount of idle time such as five minutes. If the drive is in self-scan mode and a command is received from the host computer, the drive stops smart DST and executes the command. In this way, self-scanning under smart DST is substantially transparent to host and user. After another five minutes of idle time, the drive resumes its background error scan at the location where it was interrupted. During self-scan, the drive steps through its entire storage capacity by LBA. If there is a read error, the drive makes a provisional "G list" entry and writes the corresponding LBA into the smart DST error table. The drive then stops scanning.

According to one embodiment of the present invention, a host application is provided to periodically check if one of the two mirrored drives has found an error. When an error is found, the application goes into the smart DST error table of the bad drive and reads the location of the bad LBA. It then takes data from the twin drive and fixes the error on the drive with the bad LBA. Preferably the application then restarts smart DST on both drives and again periodically checks for smart DST completion code and repairs, if necessary, as described. Preferably both drives are run with smart DST enabled, and both drives are checked by the application in the same way.

Figure 38:
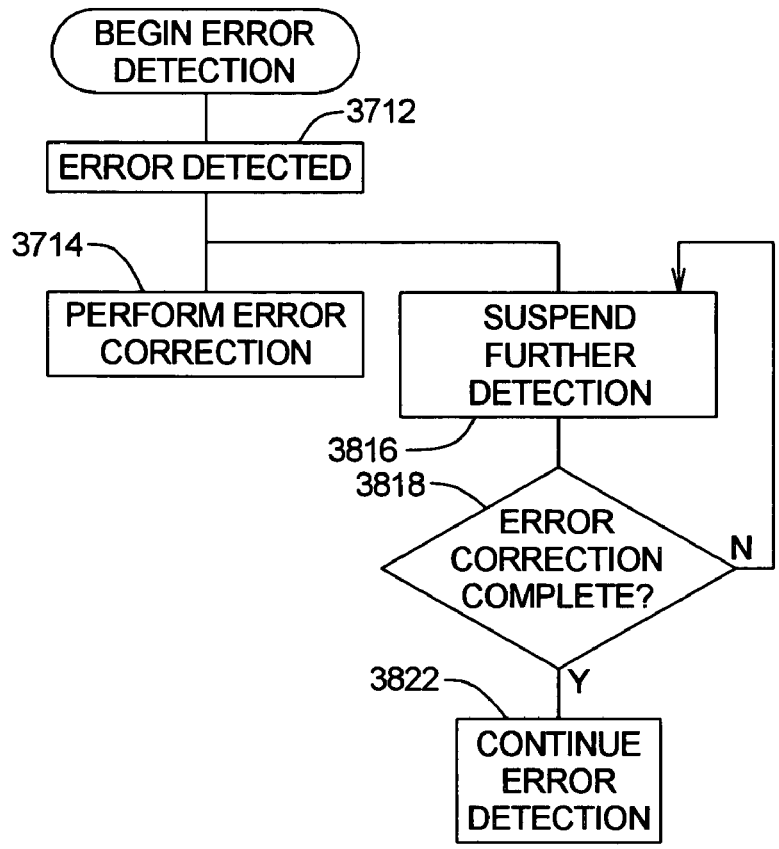
FIG. 38 is a flowchart of a procedure including error detection according to an embodiment of the present invention.
Figure 39:
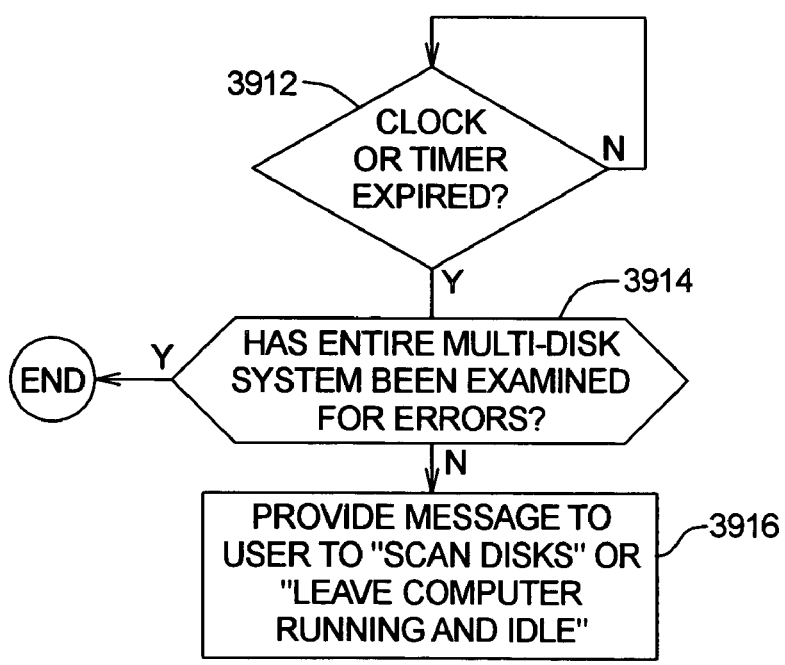
FIG. 39 is a flowchart of a procedure useful in connection with error detection according to an embodiment of the present invention.

As depicted in FIG. 37, in one embodiment after an error is detected 3712, the system corrects the error as described 3714 but also continues error detection 3716. As depicted in FIG. 38, in another embodiment, after an error is detected 3712, the system performs an error correction 3714 but suspends further detection 3816. When the error correction is completed 3818, further error detection is continued 3822. It is believed the system may fail to perform a scan in a desired amount of time, e.g., if the drives are relatively busy (such that smart DST does not get started often enough to work through the drive in a reasonable time) or in drives that are shut off immediately after use. In one embodiment, as depicted in FIG. 39, periodically or after a certain amount of time (such as one month) 3912, the system determines whether the entire multi-disk system has been examined for errors (all LBA's on all disks have been scanned) 3914. If not, the system preferably provides a message to the user 3916 advising the user to scan the disks or leave the computer running in an idle state for a period of time (e.g., overnight).

Figure 40:
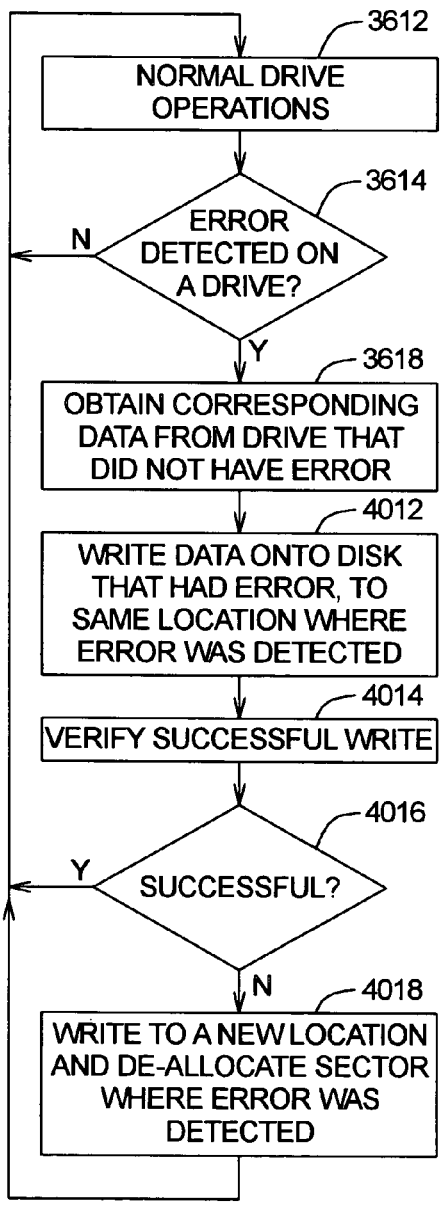
FIG. 40 is a flowchart of a procedure useful in connection with error detection according to an embodiment of the present invention.
Figure 41:
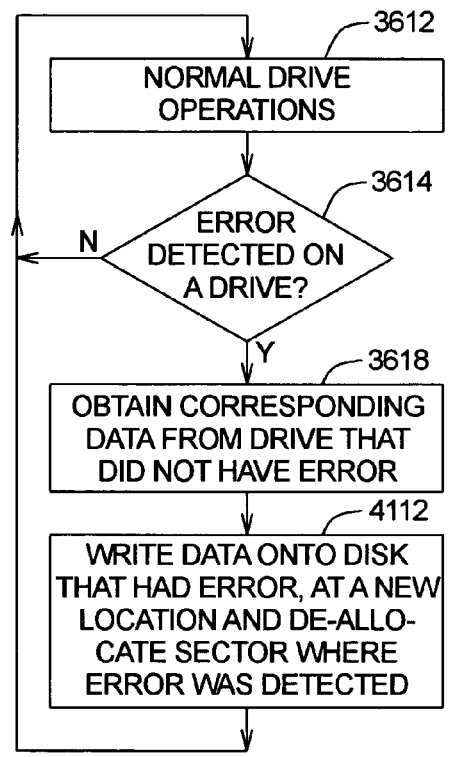
FIG. 41 is a flowchart of a procedure useful in connection with error detection according to an embodiment of the present invention.

As depicted in FIG. 40, in one embodiment, the data is written onto the disk in the same location where the error was detected 4012. Preferably writing onto this portion of the disk is verified 4014, and if the write is not successful 4016, the data is then written to a new location 4018 and the sector where the error was detected is deallocated. In another embodiment, depicted in FIG. 41, data is always written onto the disk having the error at a new location (i.e., other than the error location) 4112 and the location of the error is deallocated.

Figure 42A:
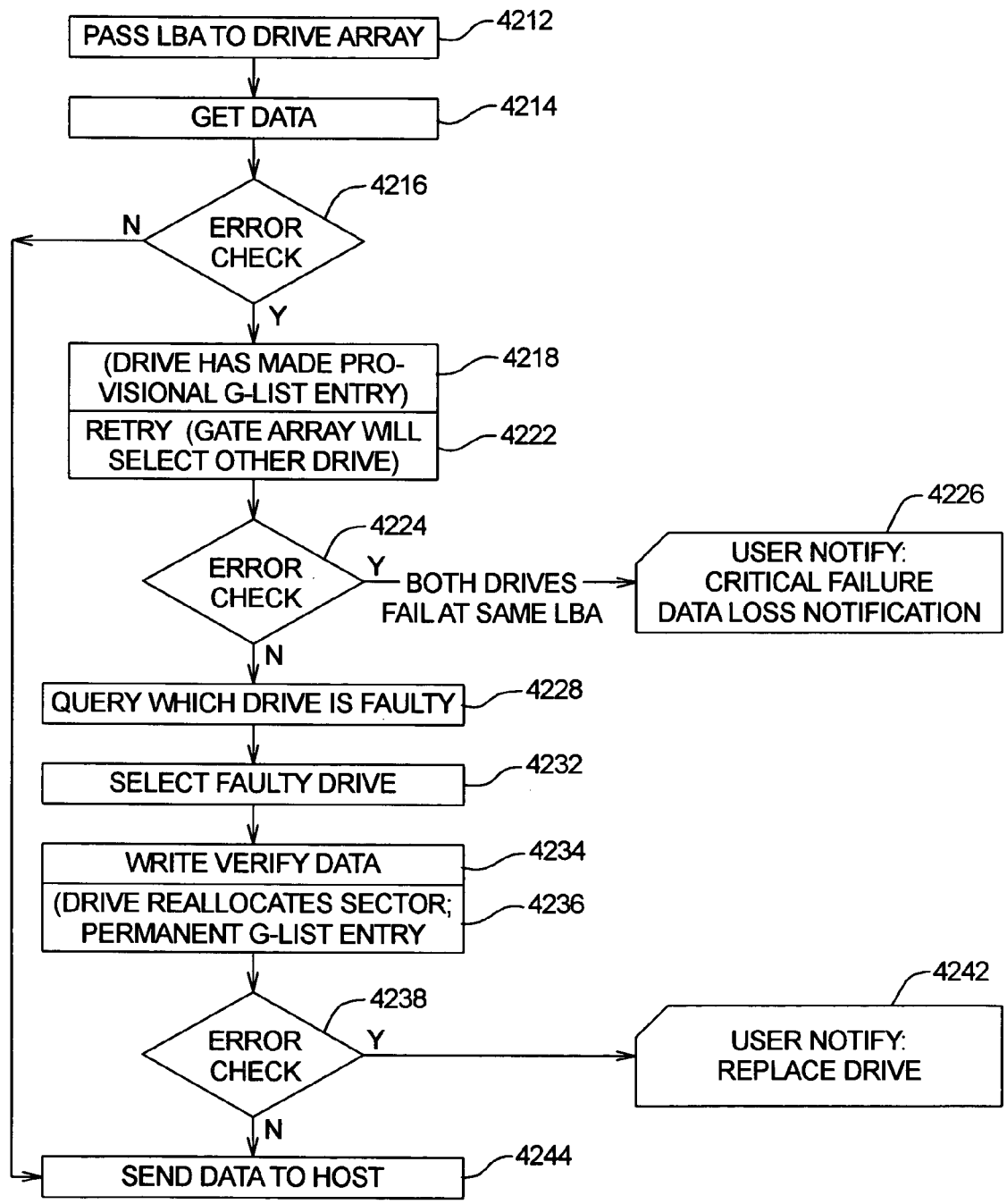
FIG. 42A is a flowchart of a procedure useful in connection with error detection in accordance with an embodiment of the present invention.

In another embodiment, rather than repairing errors as they are detected by a drive self-test or similar mechanism, software will proactively repair any errors that are detected by the host. In one embodiment, the error correction is inserted in the retry loop after normal retries and hard-assisted ECC correction, and before software-assisted ECC. In the procedure depicted in FIG. 42A, the host passes a read LBA to the drive array 4212 and sends a "get data" command 4214. If the drive detects an error in the operation 4216, it makes a provisional G-list entry 4218 and then performs a retry 4222 (at which time the gate array will select the second drive). If an error is also found on the second drive 4224, the user will be notified of a critical failure 4226 (i.e., the data is unreadable on both drives). Otherwise, the system will query which drive is faulty 4228, select the faulty drive 4232 and will write verify the data 4234, preferably reallocating the drive sector and making a permanent G-list entry 4236. If this operation results in recognition of an error 4238, the user is notified 4242, e.g., to replace the drive. Otherwise, the data is sent to the host 4244. One potential difficulty with a driver-based repair method is that typically a different driver must be written for each operating system and/or computer type.

Figure 42B:
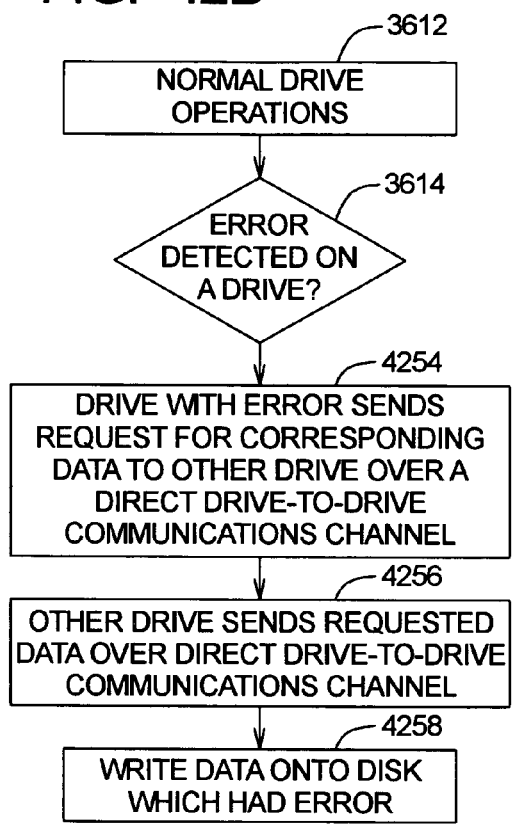
FIG. 42B is a flowchart depicting a procedure involving error detection according to an embodiment of the present invention.

In the embodiment depicted in FIG. 42B, a read error gets substantially immediately corrected with help of data from the twin drive communicated via the back channel (e.g., via serial communication in the jumper block). In particular, the drive with the error sends a request for corresponding data to the other drive over a direct drive-to-drive communications channel 4254. The other drive sends the requested data over the direct drive-to-drive communication channel 4256 and the data is written onto the disk which had the error 4258. With such drive-to-drive, on-the-fly back channel repair, the mirror drives themselves do the repair without any intervention needed from the host computer. Further, this repair method is insensitive to the type of operating system or type of computer. The entire operation is handled substantially in drive firmware. In general, it may be preferable to provide a system in which on-the-fly repair methods (either drive-based or drive-to-drive) are not the only repair mechanism in RAID one systems, due to the possibility of latent RAID errors (because data is taken only from one drive and it is not known if the data from the ignored other drive contains errors). In some embodiments, it may be possible to combine smart DST (full disk scan) repair and on-the-fly (responsive to read error) repairs.

Figure 43:
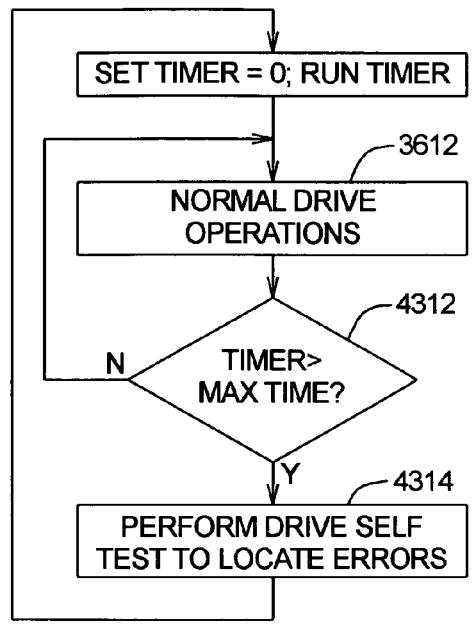
FIG. 43 is a flowchart of a procedure related to error detection according to an embodiment of the present invention.
Figure 44:
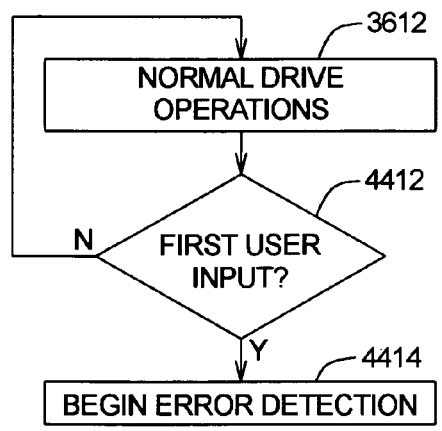
FIG. 44 is a flowchart of a procedure relating to manual initiation of error detection according to an embodiment of the present invention.

In another embodiment, as depicted in FIG. 43, the system is responsive to expiration of a predetermined amount of time 4312, which initiates the performance of a drive self-test (preferably scanning all drives) to locate errors 4314. As depicted in FIG. 44, the system can also be configured to make an error correction 4414 in response to a user input 4412 (such as clicking on an icon or the like). In one configuration, the application regularly (for example once a month) prompts the user to start a complete repair by clicking on an icon or the like (preferably accompanied by a warning that this may take a certain amount of time). This approach is believed useful especially in cases where smart DST repair does not progress because the machine is kept too busy or is turned off immediately after use.

In the embodiments of FIGS. 43 and 44, in order to perform a complete scan, the application preferably reads multi-block data chunks and checks for errors. When there is an error, the application steps through the data block by block and checks for error. When it finds an error, it uses data from the twin drive to repair it. Such a scan of all drives can be made somewhat more rapid by a number of procedures. For example, the application can be configured to step through both drives simultaneously. Preferably, a driver is provided which reports the exact error location within a multi-block chunk (so that one-by-one block follow-up stepping is not necessary). If searching for blocks is performed, a binary search for the blocks in error assists in making the procedure more rapid. Preferably, 48-bit addressing is used to read 64$k$ blocks at once.

In one embodiment, the invention provides transparent fail-over in an ATA mirror. Preferably, any return status that is not error free on a particular drive causes the logic to disable further reads and, sometimes, writes from that drive. Preferably, this is done in hardware. Because host-level software can select whether writes go to both drives or whether reads come from first drive ready or a particular drive, the hardware mechanism can be made more robust through host software. A host driver may be checking failure codes from the mirror ASIC to determine if a read error is detected on a particular drive and it may choose to continue writes to that drive until total errors reach a predefined threshold, at which point it allows the drives to be disabled. In one embodiment, the invention provides serial port mastering. As part of achieving transparent fail-over, the serial port firmware is extended to allow one drive master of the other drive for purposes of sending a request which is served an interrupt and gets noticed. In at least one implementation, it is possible to guarantee that the other drive is not busy when the request comes in because it was not selected to serve the read.

According to certain embodiments of the present invention, the presence of two or more copies of data on different disk drives can be exploited to enhance performance (reduce latency, increase throughput or the like). Latency or seek time can be the result of several operations, e.g., during a disk read. Head position latency relates to the fact that, as part of a read operation, a read head must be moved to the proper track of a disk. Such movement requires a certain amount of time, roughly depending on the radial distance between the starting position of the head and the target position of the data. In a single-disk system, on average, it might be expected that, for a series of randomly positioned target locations, the head may need to move about one-half of the data radius. According to one aspect of the present invention, the operation of the drives in a RAID system are coordinated in such a fashion that for at least some types of read operations, the read head of one disk will have a higher probability of being relatively closer to a first range of addresses (such as addresses in the first half of an address range) and the second head will, on average, have an increased probability of being relatively closer to the second range of data (such as data having addresses in the second half of an address range).

Figure 45:
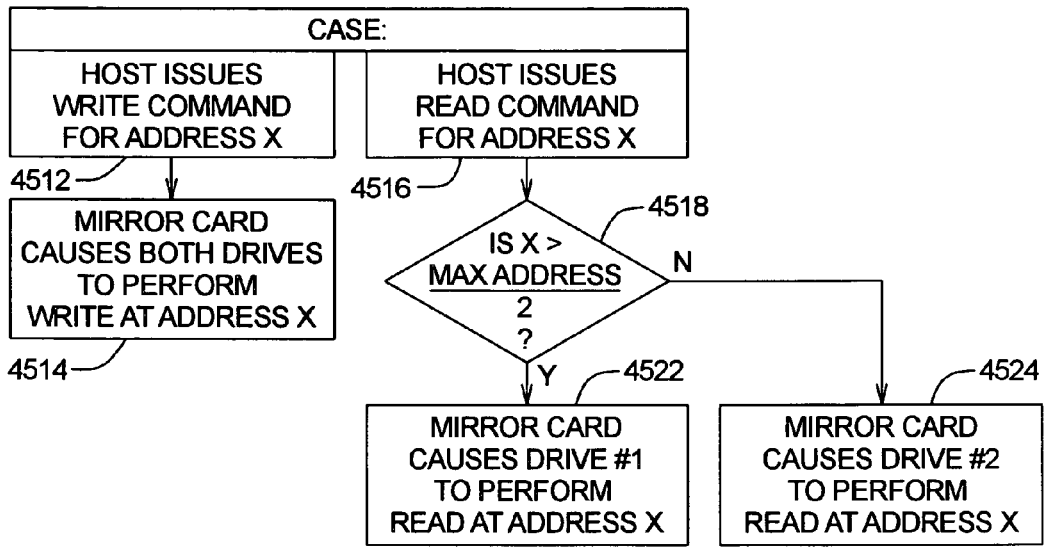
FIG. 45 is a flowchart of a procedure relating to read and write commands according to an embodiment of the present invention.

In the embodiment depicted in FIG. 45, the system is configured such that, if the host issues a write command for a particular address 4512, the mirror card causes both drives to perform the write at that address 4514. However, if the host issues a read command for a particular address "x" 4516, the system determines whether the address x is greater than the midpoint of the address range 4518. In the embodiment of FIG. 45, if the read address is greater than the midpoint of the address range, the read is performed using drive 1 4522, and if the read address is in the lower half of the address range, the mirror card causes the read to be performed on drive 2 4524. If the RAID system receives a sequence of read, write, read, write commands, there is little, if any, advantage. However, in the common situation in which the host issues of series of read commands sequentially, there is a performance advantage since the actuators will be typically in either the upper or the lower half of the LBA range and, on average, the actuators will have to move the read heads less than one-half of a stroke. Because this approach relies on assigning reads based on the address, this system is generally incompatible with the "first LBA available" procedure described below.

Figure 46:
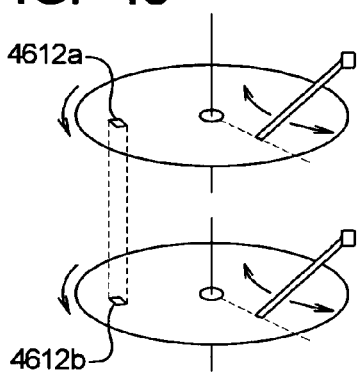
FIG. 46 is a schematic perspective view illustrating rotationally synchronized disks.
Figure 47:
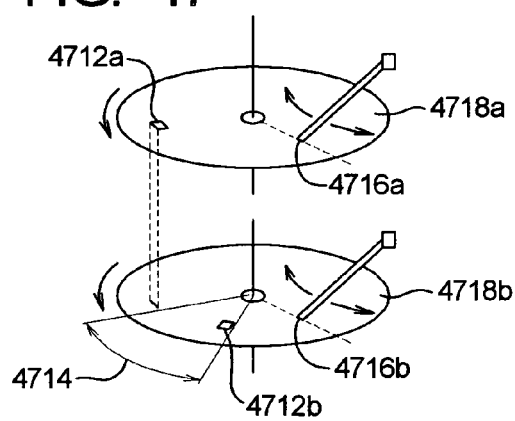
FIG. 47 is a schematic perspective view illustrating rotationally unsynchronized disks.

In addition to head positioning latency, efficiency can also be affected by rotational latency. Rotational latency in general refers to the amount of the time required for the disk to spin to the point at which the target portion of the track (sector) reaches the read head. If, as depicted in FIG. 46, corresponding data on the two drives 4612a, 4612b are rotationally synchronized (always occur at the same angular position on the two disks) there will be no rotational latency difference between reading the data from the first disk and reading the data from the second disk. However, as depicted in FIG. 47, if data on the second disk 4712b is angularly offset from the location of corresponding data on the first disk 4712a, e.g., by a first angle 4714, data on one disk (in the case of FIG. 47, data 4712b) will reach the read head 4716b before corresponding data 4712a will reach the head on the other disk 4716a. Accordingly, in the situation of FIG. 47, in response to a read request, there would be a smaller rotational latency if the data is read from the second disk 4718b rather than the first disk 4718a.

Figure 48A:
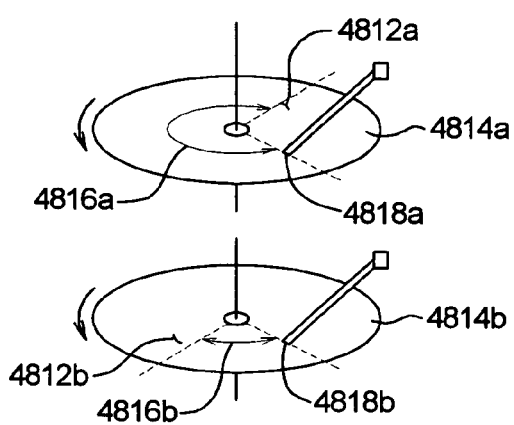
FIG. 48A is a schematic perspective view illustrating rotationally offset data according to an embodiment of the present invention.
Figure 48B:
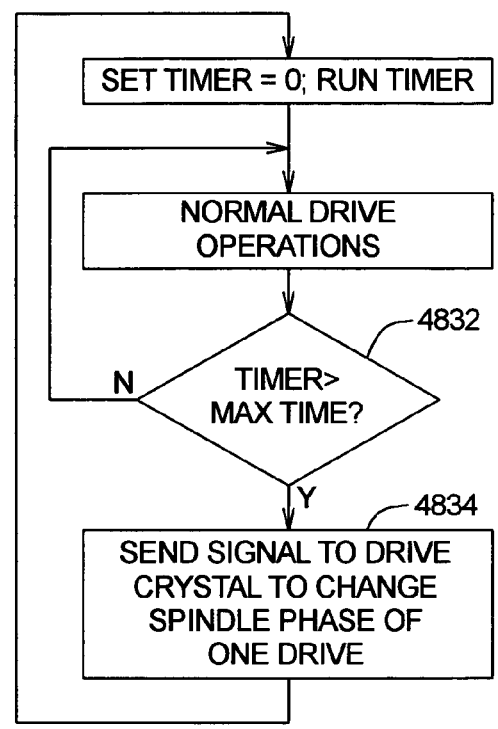
FIG. 48B is a flowchart of a process for perturbing phase, usable according to an embodiment of the present invention.

According to one embodiment, as depicted in FIG. 48B, the system can be configured to, at the expiration of predetermined times 4832 (such as e.g., every 0.5 seconds) send a signal intended to change the phase of one (or both) of the drives, such as by sending a signal to the drive crystal to change the spindle phase of one (or both) drives 4834. By periodically shifting spindle phase of one, or both, drives, it will at least be assured that the drives will not remain in rotational phase (as shown on FIG. 46) for extended periods. By assuring at least some amount of out-of-rotational phase relationship between the disks, it becomes possible to use techniques (e.g., as described below) to read data so as to achieve a lower average latency.

Figure 49:
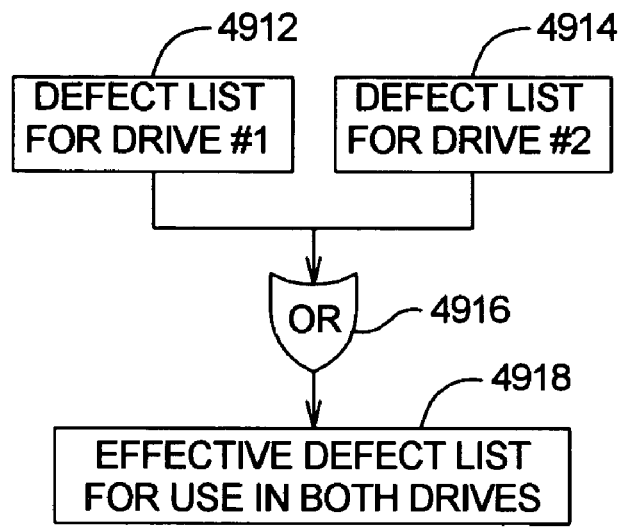
FIG. 49 is a flowchart depicting defect list formation according to an embodiment of the present invention.
Figure 50:
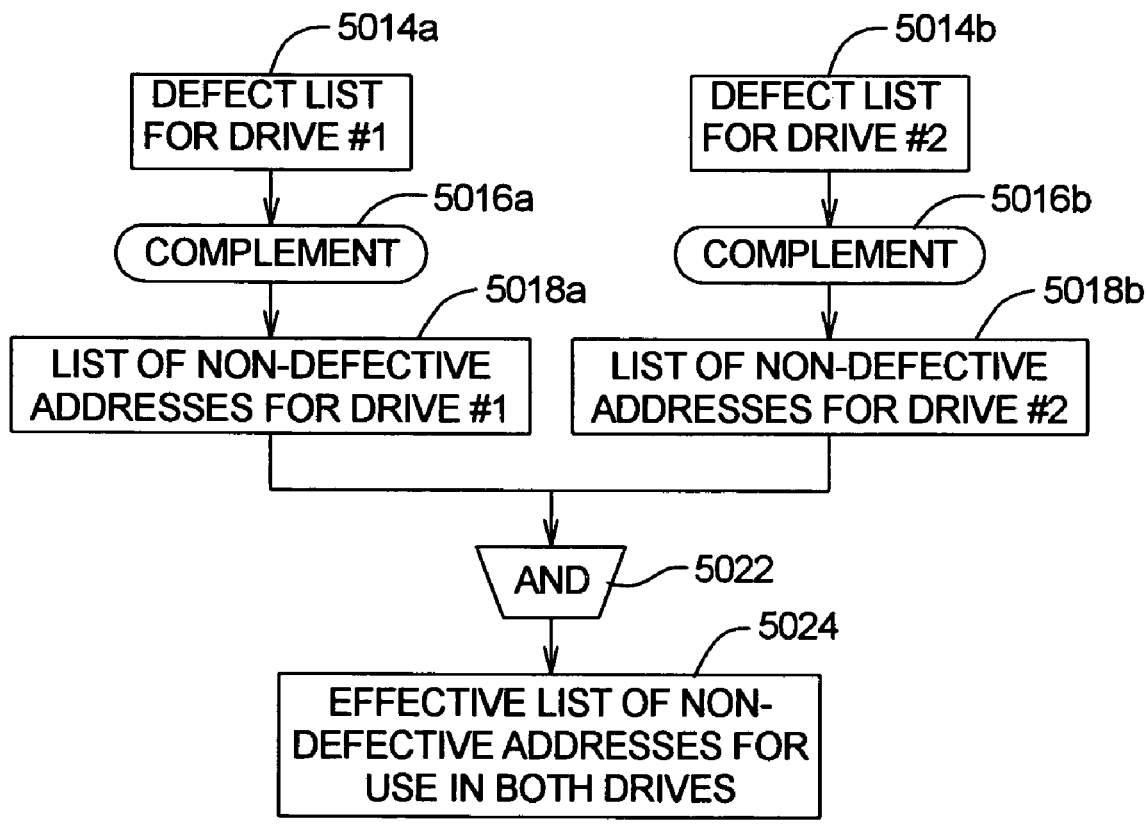
FIG. 50 is a flowchart depicting defect list formation according to an embodiment of the present invention.

In at least some situations, it may be unnecessary to actively desynchronize drive rotations as depicted in FIG. 48A. In most situations, two drives will have spindles rotating at sufficiently different frequencies, (e.g., arising from a wide-tolerance to resonator) that the spindles will automatically desynchronize periodically, such as about every minute. Furthermore, unless defect maps are mirrored (e.g., as depicted in FIGS. 49 and 50), defect maps will generally differ from drive to drive sufficiently to lead to different LBA positions effectively achieving rotational desynchronization. In general, it is believed that for two drives whose spindles are in random phase at any given time, random small block reads will be about 33 percent faster if the algorithm code "first drive ready" is used rather than "ready drive 1" or "ready drive 2."

In another embodiment, it is desired to maintain the data on the disks in a specified phase relationship such as always maintaining the corresponding data on the two disks 180 degrees out of rotational phase with each other. For example, in this situation as depicted in FIG. 48, when first data is at a given position 4812a on a first disk 4814a, corresponding data on the second disk 4814b will be in a second position 4812b such that disk rotation 4816b required to bring the data 4812b adjacent the read head 4818b will be 180 degrees less than the amount of rotation 4816a needed to bring corresponding data 4812a of the first disk 4814a adjacent the read head 4818a. By maintaining data in this relationship, it is possible to assure that data is never more than one-half revolution away from the read head on one or the other of the disks of the RAID system.

In order to assure that such 180 degree out-of-phase relationship is maintained, it will also be necessary to assure that data are recorded in substantially the same relative position on the two disks (e.g., same tracks and same sectors for corresponding data). In this way, the 180 degree relationship can be maintained by merely maintaining the spindles of the two drives 180 degrees out-of-phase.

In normal disk operations, this desired relationship of data distribution on the two disks could be defeated by disk defects (since a defect on one disk which may cause data to recorded in a given location, will typically not be repeated on the other disk so that a write operation sent to two disks could result in writing corresponding data at two different locations on corresponding disks). In the one embodiment of the present invention, the two disks of the system are provided with identical defect maps. Once defect maps are identical on both drives, corresponding LBA's will be at identical physical locations of the disks with respect to the disk index. Accordingly, if the spindles are synchronized 180 degrees out of phase, the latency for the read process will halved if the data is always taken from the drive that reaches the requested LBA first.

In the embodiment depicted in FIG. 49, the defect list for drive 1 4912 and the defect list for drive 2 4914 are combined with an OR operation 4916 to provide an effective defect list which is used in both disk drives 4918. Alternatively, lists of non-defective addresses for drives 1 and 2 5018a, 5018b (FIG. 50) such as by forming compliments 5016a, 5016b of the defect lists 5014a, 5014b, can be ANDed 5022 to provide an effective list of non-defective addresses for use in both drives 5024. Although the processes of FIGS. 49 and 50, will result in a reduced capacity of the combined system, such "defect map mirroring" is expected, in general, to reduce the capacity by only about one percent.

In general, at least some of the enhanced performance relates principally to the execution of read commands. In at least some RAID systems, write commands take longer with two drives because the system has to wait until the second drive is finished. This situation may be mitigated by the use of a write cache in both drives. In general, drives perform reads more often than they perform writes. Therefore, by achieving performance enhancements for reads, a net performance benefit generally results.

Figure 51:
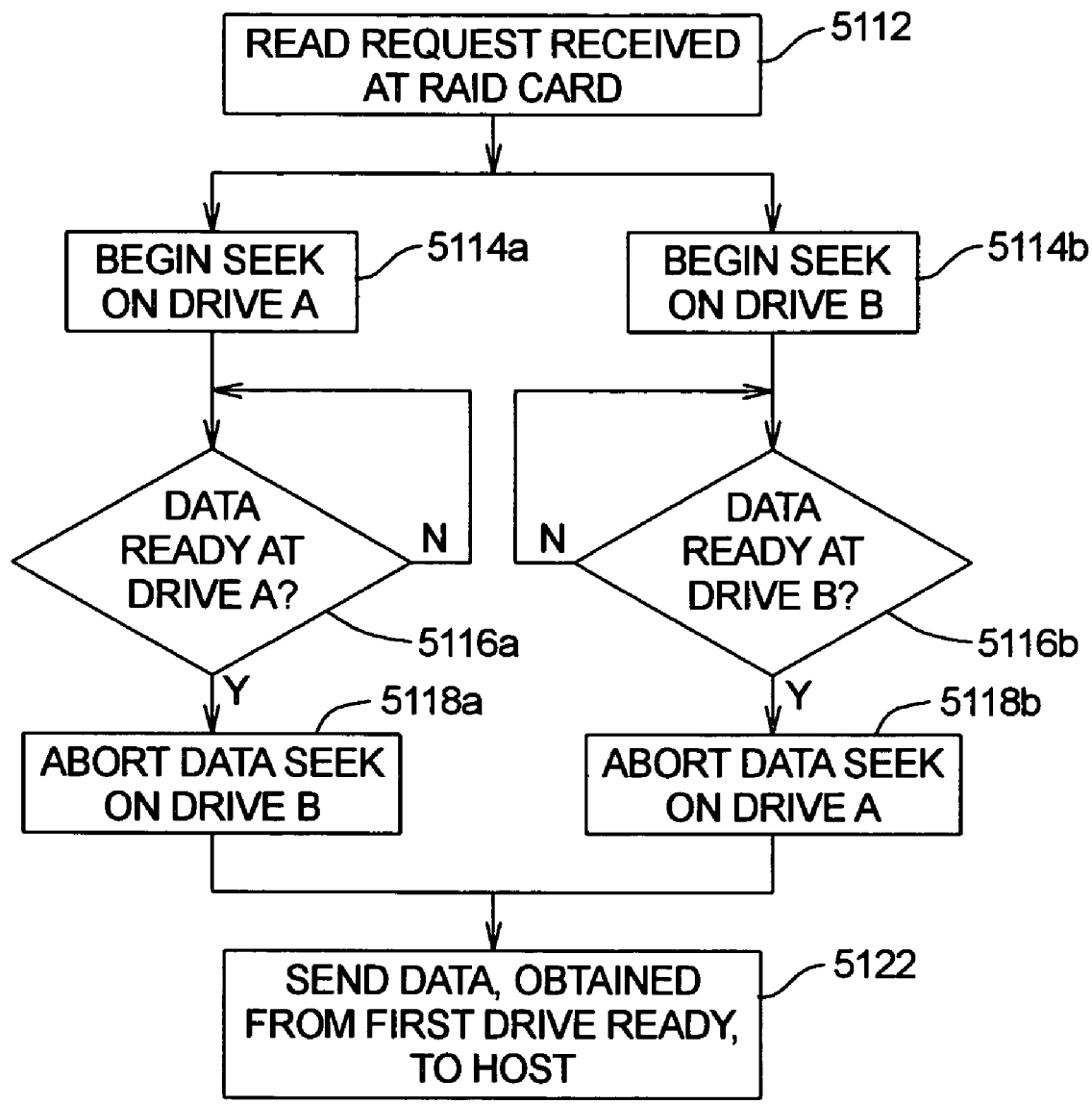
FIG. 51 is a flowchart depicting a seek abort procedure according to an embodiment of the present invention.

According to one embodiment of the present invention, some enhancement of performance is achieved by configuring the RAID controller to take data only from the faster of the two drives ("first drive ready"). As depicted in FIG. 51, when a read request is received at a RAID card 5112, the system initiates seeks on both drive A and drive B, 5114a, 5114b. As soon as data is indicated as ready on one or other of the drives, 5116a, 5116b, the data seek is aborted on the opposite drive 5118a, 5118b, i.e., if data is first ready on drive A, data seek is aborted on drive B. The data obtained from the first drive ready is then sent to the host 5122.

There is, however, no ready provision in the ATA (IDE) specification for a command abort of this type. Specifically, in order to gain the time benefit afforded by selecting the first drive ready, it is important to abort the command being serviced by the slower of the two drives (for this read) with sufficient rapidity that the benefit of reading from the first drive ready is not lost. In at least some embodiments, the abort operates on a time scale which is less than about 1-5 milliseconds.

Normally, after a command is sent to a drive by the host system, the host cannot send any additional commands until the drive completes the process. Also, once a command is issued, the drive generally no longer responds to normal task file registers. Although there is an avenue into the drive during command execution by way of the software reset bit in the device control register, sending the software reset is too slow to provide the desired benefit.

Figure 52:
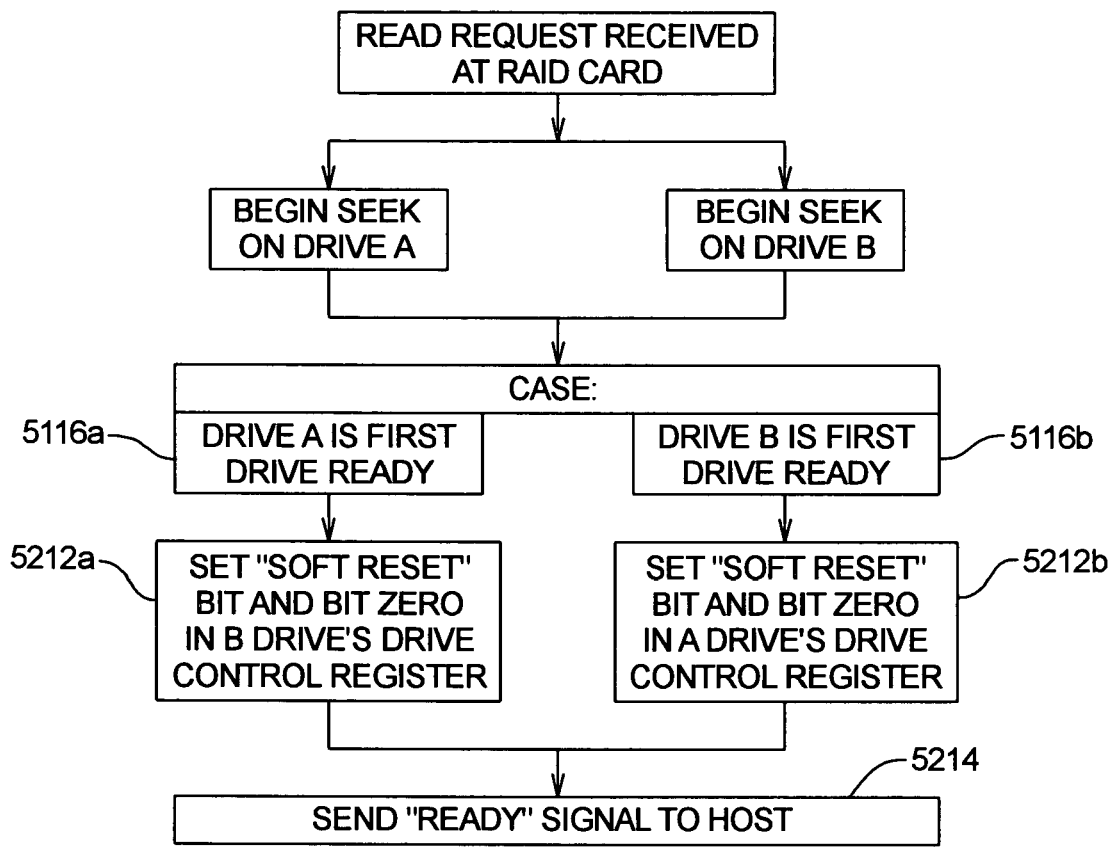
FIG. 52 is a flowchart depicting a data seek procedure according to an embodiment of the present invention.

In one embodiment of the present invention, as depicted in FIG. 52, as soon as the first drive reports data ready 5116a, 5116b (e.g., by asserting DMRQ line for DMA instructions or asserting DRQ bit for PIO instructions), the mirror card gate array issues a "fast soft reset" to the slower drive. The fast soft reset is initiated by setting both bit 2 (the soft reset bit) and bit 0 in the device control register for the slower drive 5212a, 5212b. The IDE specification defines the device control register and specifies that bit 0 should be cleared when writing to this port. By setting bit 0, the drive can immediately detect that it has received a fast soft reset (i.e., bit 2) and not the normal soft reset. The fast soft reset differs from the normal soft reset in that a read is aborted without doing any cache flushing or stack initializations. Preferably, after a fast soft reset is completed, the second drive posts an interrupt on the bus. This interrupt, from the aborted drive, is AND-connected by the mirror gate array with the interrupt of the first drive after its transfer has completed. The ANDed interrupt is then used as a signal to the host that the RAID system is ready for the next command 5214.

As depicted in FIG. 56, the first drive to post a DMARQ is the first drive with data ready 5612a, 5612b. The A first and B first flip-flops 5614a, 5614b use DMARQ to determine which drive finds the data first. As soon as one of the drives has data ready, the DO A or DO B signal 5616a, 5616b sets the DO-cancel flip-flop 5618. This signal is feed to the cancel-on flip-flop 5622 which is clocked by JO ready 5624. The output from the cancel-on flip-flop is fed to the cancel-off flip-flop 5626 which is also clocked by JO ready. The cancel-on signal and cancel-off signal go to the AND gates 5628a, 5628b. The AND gates, with help of the DO A and DO B signals 5616a, 5616b, send a cancel pulse to the proper drive.

An alternative to issuing a fast soft reset is to either not give the command to both drives or to not immediately initiate command execution on both drives. To do this effectively, it will be useful to predict which drive will get the data first. Then, only the particular drive that is determined to be fastest will get or execute a read command.

Figure 53:
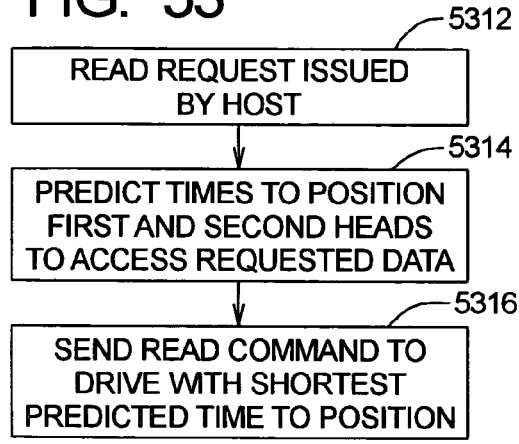
FIG. 53 is a flowchart depicting a head prediction procedure according to an embodiment of the present invention.

As depicted in FIG. 53, according to one embodiment, after a read request is issued by the host 5312, the system predicts the times required to position the first and second heads as needed to access the requested data 5314. The read command is then sent to the device with the shortest predicted time to position 5316.

Figure 54:
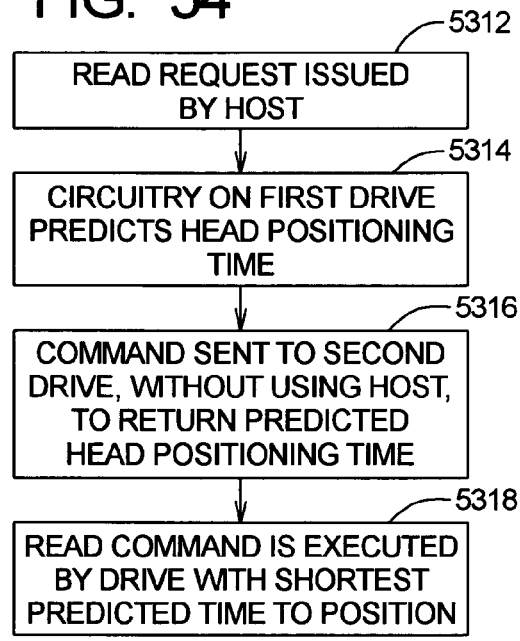
FIG. 54 is a flowchart depicting a head prediction procedure according to an embodiment of the present invention.

In the embodiment depicted in FIG. 54, one of the drives (first drive) contains circuitry which predicts head positioning time for itself, for each read command. In this embodiment, one of the drives is determined as the "master" and the other the "slave" (for this process only, the master/slave relationship for this process being independent of master/slave settings elsewhere for the system). The first, or master, drive also sends a command to the second drive via the back channel (not using the host), asking the second drive to return its predicted head positioning time 5316. The master then determines which drive should carry out the command, typically the drive with the shortest predicted time to position 5318, and, preferably, communicates this to the slave drive via the RS232 interface, as needed.

Although a number of possible head prediction systems can be used in accordance with embodiments of the present invention, in at least one embodiment, drive firmware (typically provided on the drive PCB, rather than, e.g., the RAID mirror card), includes a programmed head position prediction (HPP) system. According to this system, after start-up, the drive determines seek durations for all seeks and writes these into a table. This table, and the current head position, is then used by the firmware to calculate the distance, or seek time, to the desired LBA. Preferably, the HPP system also makes use of knowledge of any cached data and any defect list entries in calculating the time required to access data.

Figure 55:
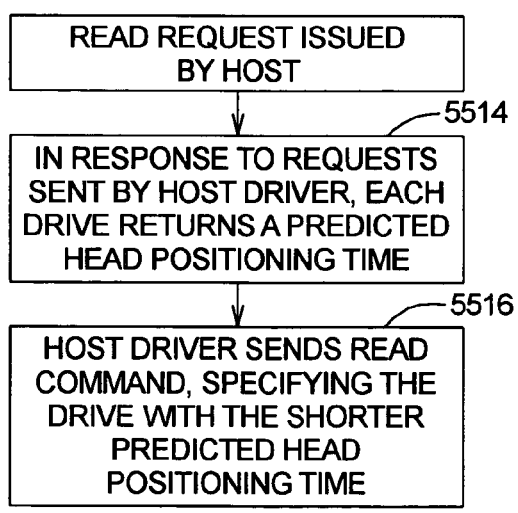
FIG. 55 is a flowchart depicting a head prediction procedure according to an embodiment of the present invention.

In another embodiment, as depicted in FIG. 55, rather than using the RS232 connection, a low level driver on the host makes decisions. The host sends requests and in response each drive returns a predicted head positioning time 5514. The host driver then sends a read command, specifying the drive with the shorter predicted head positioning time 5516. It is believed that this transaction will generally be in the range of a few tens of microseconds and, thus, will be rapid enough to have little effect on the overall access time, resulting in a net improvement of efficiency.

In light of the above description, a number of advantages of the present invention can be seen. The present invention makes it possible to achieve a well-integrated and relatively low-cost RAID system. Embodiments of the present invention can be configured to avoid occupying a PCI slot and can be configured to avoid depending on a software driver for basic functionality (although if desired, drivers can be used, e.g., for enhanced functionality). Preferably, the system can be configured to require substantially no special setup, such that installation of the RAID system is comparable to the effort involved in installing a ATA hard drive. Although the system is preferably a true hardware RAID, by making it possible to avoid or reduce the number of buffers or processors, and relying on system (drive) intelligence, a RAID system according to the present invention is relatively inexpensive. The low-complexity and robust hardware design makes the system relatively inexpensive to develop and relatively less prone to bugs, e.g., than a software solution. The system is configured so that it can be remain operational even by failure of a Windows boot sector. Preferably, the system provides transparent failover to allow no impact or notice to the user of drive failure, if desired. According to aspects of the invention, mechanical packaging can be provided in a manner to allow sealed hard drives to substantially act as data cartridges. The present invention takes advantage of the presence of two (or more) copies of data to enhance performance, such as by reducing seek time and/or rotational latency. If desired, additional performance enhancement can be achieved by combining a RAID system such as described herein with a performance filter driver (PFD), such as using host memory and/or processor power to enhance performance. In various embodiments, rotational latency can be reduced by systems which either assure that disks will not remain synchronous (with respect to data location), at least for extended periods of time, or which maintain disks in a predefined rotational relationship, such as 180 degrees out-of-phase (e.g., by mirroring defect maps). Preferably, the system can not only provide backup or recovery in response to an error or failure, but can preferably repair errors either as they are detected during use ("on-the-fly") or using various disk-scanning procedures. Preferably, the RAID disk drives are configured to fit within predefined form factors and, in some embodiments, are mechanically coupled so that they can be mounted or handled as if they were a single drive. Preferably drive configuration and mounting is provided so as to reduce cable lengths and/or card-to-drive spacing. Preferably, failure status can be retained during power off. In some embodiments, the RAID or mirror card is directly attached to two drives, preferably within the drive bay, through rigid (e.g., three-in-one), or semi-flexible cables, or a hybrid of the two. In one embodiment, the RAID drives are provided in an external box and are coupled via USB cabling, Firewire and the like. Preferably, such external box, and the drives therein, are configured to achieve substantially passive cooling, e.g., through a chimney effect. In some embodiments, RAID system drives are rail-mounted or otherwise configured to make user-removability relatively easy, e.g., without the need to open the PC chassis. The present invention can avoid certain types of data corruption such as that arising from viruses and the like by holding-off or delaying mirroring of data to a second RAID drive. The present invention can provide for a reduction in the amount of time needed to perform disk copying, e.g., by using back channel communication. The present invention can also accommodate, preferably substantially automatically, copying of data to a disk which is larger than, or smaller than, a disk which it replaced.

A number of variations and modifications of the invention can be used. Although a number of processes have been described and illustrated, in general, it is possible to implement at least some features of the present invention using procedures which have more or fewer steps, or steps performed in a different order, compared to those described and illustrated. It is possible to use some aspects of the invention without using others. Although much of the present disclosure has been in terms of disk drive data storage, there is no theoretical reason why some or all aspects of the present invention cannot be implemented in the context of other data storage devices including compact disk (CD), digital versatile disk (DVD), optical storage, magnetic tape storage, and the like. Although many features of the present invention were described in the context of twinned disk drives, there is no theoretical reason why some or all features of the present invention cannot be used in the context of the system which employs sets of three or more disk drives (or other data storage devices), either for providing triple (or higher) redundancy or for distributing redundancy among a larger number of drives. Although embodiments have been described in which disk drives operate under an ATA interface, there is no theoretical reason why some or all aspects of the present invention cannot be provided using other interfaces such as a SCSI interface and the like. Although the present invention has been described using drive select as one example of a RAID functionality, other RAID functionalities can be provided in addition, or in place of, the described RAID drive select including, e.g., data mirroring, drive failover, error correction, and the like. Although embodiments of the present invention have been described in which a mirror card uses a gate array and/or a serial-to-parallel converter, it is possible to use other items to achieve the described functionality. For example, although it is preferred to avoid the use of a microprocessor (in order to reduce cost), there is no theoretical reason why a microprocessor could not be configured to provide the described functionality. As another example, rather than using gate array logic, it would be possible to implement at least some features of the present invention using an application specific integrated circuit (ASIC), e.g., if justified by volume. Although embodiments of some functions have been described and/or illustrated by way of logic gate diagrams, e.g., as in FIGS. 7-11, and elsewhere, those with skill in the art will understand that such logic, or equivalent logic, or logic to provide equivalent functionality, can be implemented in a number of manners and those with skill in the art will understand how to make and use a variety of logic implementations, including implementations of logic in programmable gate arrays, ASICS, hardwire logic, (including, in some cases, dot ORs and the like) and similar implementations.

The present invention, in various embodiments, includes components, methods, processes, systems and/or apparatus substantially as depicted and described herein, including various embodiments, sub-combinations, and subsets thereof. Those with skill in the art will understand how to make and use the present invention after understanding the present disclosure. The present invention, and various embodiments, includes providing the devices and processes in the absence of items not depicted and/or described herein or in various embodiments hereof, including in the absence of such items as may have been used in previous devices or processes, e.g., for improving performance, achieving ease and/or reducing cost of implementation. The present invention includes items which are novel, and terminology adapted from previous and/or analogous technologies, for convenience in describing novel items or processes, do not necessarily retain all aspects of conventional usage of such terminology.

The foregoing discussion of the invention has been presented for purposes of illustration and description. The foregoing is not intended to limit the invention to the forms or form disclosed herein. Although the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including ultimate, interchangeable and/or equivalent structures, functions, ranges or steps to those claimed, whether or not such ultimate, interchangeable and/or equivalent structures, functions, ranges or steps are disclosed herein, and without intending to publicly dedicate any patentable subject matter.

What is claimed is:
1. An apparatus comprising:
a processorless, bufferless mirror card providing at least first RAID functionality, said RAID functionality provides that a first storage device stores substantially all data stored on a second storage device.
2. Apparatus as claimed in claim 1, further comprising:

means, in each of said first and second storage devices, capable of providing a status signal which is indicative of a ready/busy status; and wherein said means capable of providing the status signal includes means for transmitting a signal which is a logical OR of said status signal of said first storage device and said status signal of said second storage device, wherein transfer of data is suspended until both storage devices are ready.

3. Apparatus, as claimed in claim 2 wherein said storage devices use a PIO mode transfer, and further comprising means for creating said logical OR from traces carrying a BUSY signal of said first storage device and a BUSY signal of said second storage device respectively.

4. Apparatus, as claimed in claim 3, wherein said means for creating comprises an OR gate.

5. Apparatus, as claimed in claim 2, wherein said storage devices use a Direct Memory Access (UDMA) write, and further comprising means for creating said logical OR from traces carrying a DDMARDY* (DIOR*) signal of said first storage device and a Direct Memory Access Ready (Drive Input.Output Ready) DMARDY* (DIOR*) signal of said second storage device respectively.

6. Apparatus as claimed in claim 5, wherein said means for creating comprises a Logical OR.

7. Apparatus comprising:
a processorless, bufferless mirror card at least indirectly coupled to first and second storage devices, said processorless, bufferless mirror card containing circuitry configured to provide an ATA controller for achieving at least first RAID system functionality with respect to said first and second storage devices.

8. Apparatus as claimed in claim 7 further comprising first and second multi-conductor couplers on said processorless, bufferless mirror card, sized and shaped to engage with corresponding multi-conductor couplers on said first and second storage devices, when said first and second storage devices are positioned in first and second operational positions, respectively, with respect to said processorless, bufferless mirror card;
first and second rail structures in substantially fixed positions with respect to said processorless, bufferless mirror card, configured to guide said first and second storage devices from disengaged positions to said first and second operational positions, respectively.

9. Apparatus as claimed in claim 8 wherein said multi-conductor couplers comprise low-insertion-force couplers.

10. Apparatus as claimed in claim 9 further comprising at least a first ATA connector for coupling to a host computer, wherein at least one of said storage devices can be removed by decoupling using said low-insertion-force coupler, without the need for decoupling said first ATA connector.

11. Apparatus as claimed in claim 10 wherein said ATA connector is provided on a second circuit board, different from and coupled to said processorless, bufferless mirror card.

12. Apparatus as claimed in claim 11 wherein said second circuit board also includes a power connector for coupling to a power source.

13. Apparatus as claimed in claim 8 further comprising at least a first latch for retaining at least one of said first and second storage devices in its operational position.

14. Apparatus as claimed in claim 7 wherein each of said first and second storage devices are a 3.5 inch drive.

15. A method comprising the step of:
coupling a processorless, bufferless mirror card to first and second storage devices, said processorless, bufferless mirror card containing circuitry configured to provide an ATA controller for achieving at least first RAID system functionality with respect to said first and second storage devices, wherein said second storage device stores substantially all of the data which is stored on said first storage device.

16. A method as claimed in claim 15 further comprising:
providing first and second multi-conductor couplers on said processorless, bufferless minor card, sized and shaped to engage with corresponding multi-conductor couplers on said first and second storage devices, when said first and second storage devices are positioned in first and second operational positions, respectively, with respect to said processorless, bufferless minor card;
positioning first and second rail structures in substantially fixed positions with respect to said processorless, bufferless mirror card, configured to guide said first and second storage devices from disengaged positions to said first and second operational positions, respectively.

17. A method as claimed in claim 16 further comprising at least partially covering each of said first and second storage devices with a shock-absorbent material.

18. A method as claimed in claim 17 wherein said shock-absorbent resilient material comprises rubber.

19. A method as claimed in claim 15 further comprising restricting access to, or removal of, at least one of said first and second storage devices.

* * * * *